United States Patent
Li et al.

(10) Patent No.: US 10,735,998 B2
(45) Date of Patent: Aug. 4, 2020

(54) METHOD FOR SENDING CHANNEL RESERVATION SIGNAL AND BASE STATION

(71) Applicant: Huawei Technologies Co., Ltd., Shenzhen (CN)

(72) Inventors: Hantao Li, Beijing (CN); Zhenyu Li, Beijing (CN); Jinxia Han, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

(21) Appl. No.: 16/016,339

(22) Filed: Jun. 22, 2018

(65) Prior Publication Data

US 2018/0343589 A1   Nov. 29, 2018

Related U.S. Application Data

(63) Continuation of application No. PCT/CN2016/073701, filed on Feb. 5, 2016.

(30) Foreign Application Priority Data

Dec. 24, 2015  (WO) ................ PCT/CN2015/098782

(51) Int. Cl.
  *H04W 28/26* (2009.01)
  *H04W 74/08* (2009.01)
  *H04W 16/14* (2009.01)

(52) U.S. Cl.
  CPC .......... *H04W 28/26* (2013.01); *H04W 16/14* (2013.01); *H04W 74/08* (2013.01); *H04W 74/0825* (2013.01)

(58) Field of Classification Search
  CPC .. H04W 28/26; H04W 16/14; H04W 74/0825
  See application file for complete search history.

(56) References Cited

U.S. PATENT DOCUMENTS

| 2014/0341018 A1 | 11/2014 | Bhushan et al. |
| 2015/0156650 A1 | 6/2015 | Li et al. |

(Continued)

FOREIGN PATENT DOCUMENTS

| CN | 104125573 A | 10/2014 |
| CN | 104301273 A | 1/2015 |

(Continued)

OTHER PUBLICATIONS

Broadcom Corp. et al.,"Robust Coexistence LAA-LTE", 3GPP TSG RAN WG1 Meeting #79, San Francisco, USA, Nov. 17-21, 2014, R1-145167, XP050876190, 10 pp.

(Continued)

*Primary Examiner* — Ricky Q Ngo
*Assistant Examiner* — Stephen N Steiner
(74) *Attorney, Agent, or Firm* — Leydig, Voit & Mayer, Ltd.

(57) ABSTRACT

A method for sending a channel reservation signal and a base station, related to the field of communications technologies, includes: detecting, by a base station, whether a system signal is received on an unlicensed channel; and sending, by the base station, a channel reservation signal on the unlicensed channel to reserve the unlicensed channel based on the base station detecting that the system signal is received on the unlicensed channel.

24 Claims, 11 Drawing Sheets

(56) References Cited

U.S. PATENT DOCUMENTS

| | | | |
|---|---|---|---|
| 2015/0195849 A1* | 7/2015 | Bashar | H04W 16/14 370/330 |
| 2015/0223075 A1* | 8/2015 | Bashar | H04W 16/14 370/329 |
| 2015/0250002 A1 | 9/2015 | Sun et al. | |
| 2016/0227578 A1* | 8/2016 | Lee | H04W 74/004 |
| 2017/0048879 A1 | 2/2017 | Zhang et al. | |
| 2017/0280331 A1 | 9/2017 | Gou et al. | |
| 2018/0091242 A1* | 3/2018 | Li | H04B 17/382 |

FOREIGN PATENT DOCUMENTS

| | | |
|---|---|---|
| CN | 104486013 A | 4/2015 |
| CN | 104507108 A | 4/2015 |
| CN | 104540164 A | 4/2015 |
| CN | 104717687 A | 6/2015 |
| CN | 104968052 A | 10/2015 |
| CN | 105050190 A | 11/2015 |
| JP | 2015026935 A | 2/2015 |
| JP | 2016524854 A | 8/2016 |
| WO | 2014189908 A2 | 11/2014 |
| WO | 2015106883 A1 | 7/2015 |
| WO | 2015116789 A1 | 8/2015 |
| WO | 2015165084 A1 | 11/2015 |
| WO | 2015174748 A1 | 11/2015 |

OTHER PUBLICATIONS

"UL framework for LAA," 3GPP TSG-RAN WG1#83, Anaheim, USA, R1-156994, 3rd Generation Partnership Project, Valbonne, France (Nov. 15-22, 2015).

* cited by examiner

METHOD FOR SENDING CHANNEL RESERVATION SIGNAL AND BASE STATION

CROSS-REFERENCE TO RELATED APPLICATIONS

This application is a continuation of International Application No. PCT/CN2016/073701, filed on Feb. 5, 2016, which claims priority to International Application No PCT/CN2015/098782, filed on Dec. 24, 2015. The disclosures of the aforementioned applications are hereby incorporated by reference in their entireties.

TECHNICAL FIELD

Embodiments of the present invention relate to the field of communications technologies, and in particular, to a method for sending a channel reservation signal and a base station.

BACKGROUND

A key to coexistence of a licensed-assisted access (LAA) system, that is, a Long Term Evolution-Unlicensed (U-LTE) system, and a Wireless Fidelity (WiFi) system is to effectively avoid co-channel interference caused when the two systems simultaneously occupy an unlicensed channel, that is, an unlicensed spectrum.

A network element in the LAA system includes a base station, and a network element in the WiFi system includes a WiFi access point (AP). The base station uses a carrier sense/clear channel assessment (CS/CCA) mechanism to detect whether a current unlicensed channel is occupied. In the mechanism, the WiFi AP can detect only a signal whose signal strength is greater than or equal to a detection threshold, and different detection thresholds are used when the WiFi AP detects an intra-system signal (that is, a WiFi signal) and an inter-system signal (such as an LAA signal). An example in which a system bandwidth is 20 MHz (megahertz) is used. A detection threshold used when the WiFi AP detects a WiFi signal is −82 dBm, and a detection threshold used when the WiFi AP detects an LAA signal is −62 dBm. If signal strength of an LAA signal is in the range of −82 dBm to −62 dBm, the WiFi AP cannot detect the LAA signal. As a result, when the base station sends, on the unlicensed channel, an LAA signal whose signal strength is in the range of −82 dBm to −62 dBm, the WiFi AP cannot effectively avoid using the unlicensed channel. Finally, co-channel interference may be caused because the base station and the WiFi AP simultaneously send a signal on the unlicensed channel.

To resolve the foregoing problem, the base station may send a channel reservation signal on the unlicensed channel. The channel reservation signal uses a WiFi frame format. In this way, the WiFi AP considers the LAA system to which the base station belongs as an intra-system, and therefore sets the detection threshold to −82 dBm. Therefore, the WiFi AP can detect the LAA signal whose signal strength is in the range of −82 dBm to −62 dBm, and when the LAA signal whose signal strength is in the range of −82 dBm to −62 dBm occupies the unlicensed channel, the WiFi AP can avoid using the unlicensed channel. Therefore, a probability of co-channel interference is reduced.

In the foregoing channel reservation signal sending process, the base station sends the channel reservation signal each time the base station needs to occupy the unlicensed channel. This causes resource waste.

SUMMARY

Embodiments of the present invention provide a method for sending a channel reservation signal and a base station, to reduce resource waste.

To achieve the foregoing objective, the following technical solutions are used in the embodiments of the present invention:

According to a first aspect, a method for sending a channel reservation signal is provided, including:

detecting, by a base station, whether the base station receives a system signal on an unlicensed channel; and sending, by the base station if the base station detects that the base station receives the system signal on the unlicensed channel, a channel reservation signal on the unlicensed channel to reserve the unlicensed channel.

According to the method for sending a channel reservation signal provided in this embodiment of the present invention, if the base station detects that the base station receives the system signal on the unlicensed channel, the base station sends the channel reservation signal on the unlicensed channel to reserve the unlicensed channel. Compared with the prior art in which a channel reservation signal is sent each time before an unlicensed channel needs to be occupied, some resources can be saved in this embodiment of the present invention.

According to a second aspect, a base station is provided, including a detection unit and a sending unit, where the detection unit is configured to detect whether the base station receives a system signal on an unlicensed channel; and the sending unit is configured to: if the detection unit detects that the base station receives the system signal on the unlicensed channel, send a channel reservation signal on the unlicensed channel to reserve the unlicensed channel.

The base station in this embodiment of the present invention can be configured to execute the method for sending a channel reservation signal described in the first aspect. Therefore, for a technical effect that can be achieved by the base station, refer to the technical effect achieved when the base station performs the method for sending a channel reservation signal in the first aspect. Details are not described herein again.

In the foregoing first aspect, optionally, the sending, by the base station if the base station detects that the base station receives the system signal on the unlicensed channel, a channel reservation signal on the unlicensed channel to reserve the unlicensed channel may include: performing, by the base station, clear channel assessment CCA if the base station detects that the base station receives the system signal on the unlicensed channel; and sending, by the base station if a detection result of the CCA is that the unlicensed channel is idle, the channel reservation signal on the unlicensed channel to reserve the unlicensed channel.

Correspondingly, in the foregoing second aspect, optionally, the detection unit may be further configured to: if detecting that the base station receives the system signal on the unlicensed channel, perform clear channel assessment CCA; and the sending unit may be specifically configured to: if a detection result of the CCA is that the unlicensed channel is idle, send the channel reservation signal on the unlicensed channel to reserve the unlicensed channel.

Compared with a prior-art technical solution in which no operation is performed before a channel reservation signal is sent, in this optional implementation, it can be ensured that the unlicensed channel is idle when the base station sends the channel reservation signal. This increases a probability that the channel reservation signal sent by the base station is received by an intra-system or an inter-system to which the system signal belongs, and therefore increases a probability of achieving objectives of channel reservation and co-channel interference avoidance.

In the foregoing first aspect, optionally, the detecting, by a base station, whether the base station receives a system signal on the unlicensed channel may include: detecting, by the base station in each detection period, whether the base station receives the system signal on the unlicensed channel, where the detection period includes one or more detection durations. In this case, the performing, by the base station, CCA if the base station detects that the base station receives the system signal on the unlicensed channel may include: if the base station detects, in any one detection duration, that the base station receives the system signal on the unlicensed channel, stopping detection of the system signal in a detection period to which the detection duration belongs, and performing CCA.

Correspondingly, in the foregoing second aspect, optionally, the sending unit may be specifically configured to detect, in each detection period, whether the base station receives the system signal on the unlicensed channel, where the detection period includes one or more detection durations. In this case, the detection unit may be specifically configured to: if detecting, in any one detection duration, that the base station receives the system signal on the unlicensed channel, stop detection of the system signal in a detection period to which the detection duration belongs, and perform CCA.

This optional implementation provides a coarse-grained detection period and a fine-grained detection duration. The coarse-grained detection period can be used to avoid missing detection of the system signal, and the fine-grained detection duration can be used by the base station to quickly detect the system signal.

In the foregoing first aspect, optionally, the performing, by the base station, CCA may include: starting, by the base station in a cell on/off mechanism, performing CCA in N subframes prior to a moment at which an LAA system to which the base station belongs enters a cell on state, where a duration of the N subframes is greater than or equal to a maximum duration of one-time data sending in a system to which the system signal belongs.

Correspondingly, in the foregoing second aspect, optionally, when performing CCA, the detection unit may be specifically configured to start, in a cell on/off mechanism, performing CCA in N subframes prior to a moment at which an LAA system to which the base station belongs enters a cell on state, where a duration of the N subframes is greater than or equal to a maximum duration of one-time data sending in a system to which the system signal belongs.

For the cell on/off mechanism, a cell on duration and a cell off duration are relatively constant. Therefore, a demarcation point between cell on and cell off is generally constant. In this optional implementation, the demarcation point between cell on and cell off is changed. Specifically, a start moment at which the base station sends the channel reservation signal is used as a new demarcation point. Preferably, if the channel reservation signal is sent immediately when it is determined that the detection result of the CCA is that the channel is idle, a moment at which the detection result of the CCA is that the channel is idle is used as the new demarcation point.

In any optional implementation related to the CCA in the first aspect or the second aspect, optionally, the CCA meets at least one of the following conditions: Condition 1: a value of a detection threshold for the CCA is less than or equal to d, where d denotes a smaller value between a detection threshold used by the base station to perform CCA for an intra-system and a detection threshold used by the base station to perform CCA for an inter-system; or Condition 2: a detection duration of the CCA is greater than or equal to a larger value between a detection duration of CCA performed by the base station for an intra-system and a detection duration of CCA performed by the base station for an inter-system; or Condition 3: a defer duration of the CCA is greater than or equal to a larger value between a defer duration of CCA performed by the base station for an intra-system and a defer duration of CCA performed by the base station for an inter-system.

This optional implementation provides enhanced CCA, that is, CCA with a decreased detection threshold and/or CCA with a prolonged detection duration. When the system signal is an inter-system signal, the detection threshold for the CCA may be set low enough. In this way, the base station can sense an inter-system signal with relatively low transmit power. In addition, the base station prolongs the detection duration of the CCA, so that detection precision of performing CCA by the base station can be increased.

Optional implementation 1: For the first aspect, the sending, by the base station, a channel reservation signal on the unlicensed channel may include: successively sending, by the base station, S channel reservation signals on the unlicensed channel. Correspondingly, for the second aspect, the sending unit may be specifically configured to successively send S channel reservation signals on the unlicensed channel. A reservation field of an $s^{th}$ channel reservation signal is used to mark a sum of a to-be-reserved duration and a duration occupied by the $(s+1)^{th}$ channel reservation signal to the $S^{th}$ channel reservation signal, where $1 \leq s \leq S$, both S and s are integers, and the to-be-reserved duration is a duration required for data transmission on the unlicensed channel.

The optional implementation 1 may be based on a cell on/off mechanism or an LBT mechanism. This optional embodiment may be understood as follows: When the detection result of the CCA is that the unlicensed channel is idle, a plurality of channel reservation signals are sent immediately, and the channel reservation signal in this embodiment is unrelated to an OFDM symbol.

Optional implementation 2: For the first aspect, the sending, by the base station, a channel reservation signal on the unlicensed channel may include: sending, by the base station, the channel reservation signal on each target OFDM symbol on the unlicensed channel. Correspondingly, for the second aspect, the sending unit may be specifically configured to send the channel reservation signal on each target orthogonal frequency division multiplexing OFDM symbol on the unlicensed channel.

The target OFDM symbols are P OFDM symbols starting from the first OFDM symbol following an OFDM symbol of a target moment, the target moment is a moment at which the detection unit determines that the detection result of the CCA is that the unlicensed channel is idle, and P is an integer greater than or equal to 1.

The optional implementation 2 may be understood as follows: The channel reservation signal is sent starting from the first OFDM symbol following an OFDM symbol occupied when the detection result of the CCA is that the unlicensed channel is idle, and the channel reservation signal is sent by using an OFDM symbol as a time unit.

Compared with the prior art in which a base station sends a channel reservation signal at a fixed location in a subframe (for example, a subframe start boundary of a subframe or the third OFDM symbol following the subframe start boundary), in the optional implementations 1 and 2, the following prior-art problem can be avoided: Because the base station sends the channel reservation signal at the fixed location, an unlicensed channel is preempted by an intra-system or an inter-system in a time segment from a moment at which a detection result of CCA is that the unlicensed channel is idle to a moment at which the channel reservation signal is sent at the fixed location. In this way, the LAA system to which the base station belongs can quickly reserve the unlicensed channel. In addition, when S>1, that is, when the base station sends a plurality of channel reservation signals, a reception success rate and a decoding success rate of a channel reservation signal receiving party for the channel reservation signals can be increased.

In the foregoing optional implementation 2, for the first aspect or the second aspect, if P is greater than 1, a method for marking a reservation field of a channel reservation signal on the target OFDM symbol includes but is not limited to the following manners 1 to 3:

Manner 1: A reservation field of the channel reservation signal sent on a $p^{th}$ target OFDM symbol is used to mark a duration left after the $p^{th}$ target OFDM symbol is occupied by the channel reservation signal, and a reservation field of the channel reservation signal sent on a $P^{th}$ target OFDM symbol is used to mark a sum of a to-be-reserved duration and a duration left after the $P^{th}$ target OFDM symbol is occupied by the channel reservation signal, where $1 \leq p < P$, and p is an integer.

Manner 2: A reservation field of each channel reservation signal sent on each target OFDM symbol is used to mark a sum of a to-be-reserved duration and a duration left after the target OFDM symbol is occupied by the channel reservation signal.

Manner 3: A reservation field of the channel reservation signal sent on an $m^{th}$ target OFDM symbol is used to mark a sum of a to-be-reserved duration and (P−m)*OFDM symbol durations, where $1 \leq m \leq P$, and m is an integer.

In the manners 1, 2, and 3, the channel reservation signal on each target OFDM symbol reserves the duration left after the OFDM symbol is occupied by the channel reservation signal. This can prevent the unlicensed channel from being preempted by the intra-system or the inter-system in the remaining duration of each target OFDM symbol. In addition, in the manner 2, a reservation does not need to be made according to an index of an OFDM symbol, and implementation is simple. In the manner 3, the to-be-reserved duration can be accurately reserved by using any target OFDM symbol. It should be noted that, during specific implementation, some features of the manners 1, 2, and 3 may be combined according to an actual requirement when they do not conflict with each other, to form new methods for marking a reservation field. The new methods are not enumerated herein.

In the foregoing manners 1, 2, and 3, for the first aspect or the second aspect, optionally, when the system signal is a WiFi signal, padding information is further sent in a duration left after any one or more target OFDM symbols are occupied by the channel reservation signal, where the padding information may include but is not limited to any one piece of the following information (1) to (3): (1) a WiFi control frame; or (2) a combination of a WiFi signal preamble and a signal field; or (3) a combination of a WiFi signal preamble, a signal field, and invalid data.

The padding information may be sent before or after a target channel reservation signal (that is, the foregoing channel reservation signal). The target channel reservation signal may be represented by the WiFi control frame, or by the combination of the WiFi signal preamble and the signal field.

Further, optionally, for the first aspect or the second aspect, if the padding information in the target OFDM symbol includes either of the following information: the combination of the WiFi signal preamble and the signal field or the combination of the WiFi signal preamble, the signal field, and the invalid data, and the padding information in the target OFDM symbol is sent after the channel reservation signal in the OFDM symbol, a length field in the signal field is marked as 0. This avoids the following case: The channel reservation signal receiving party receives and parses subsequent data according to the length field, and therefore incorrectly considers a complete channel reservation signal as LAA service data.

In addition, for the first aspect or the second aspect, if the padding information in the target OFDM symbol includes either of the following information: the combination of the WiFi signal preamble and the signal field or the combination of the WiFi signal preamble, the signal field, and the invalid data, and the padding information in the target OFDM symbol is sent before the channel reservation signal in the OFDM symbol, a length field in the signal field is marked as 0 or a duration left after the target OFDM symbol is occupied by the signal preamble and the signal field.

In any one of the first aspect or the optional implementations of the first aspect, optionally, the sending, by the base station, a channel reservation signal on the unlicensed channel may include: sending, by the base station, a first channel reservation signal on the unlicensed channel, and sending a second channel reservation signal after a preset time segment expires. Correspondingly, in any one of the second aspect or the optional implementations of the second aspect, optionally, the sending unit may be specifically configured to: send a first channel reservation signal on the unlicensed channel, and send a second channel reservation signal after a preset time segment expires.

A modulation order of data transmitted in a subframe of the second channel reservation signal is less than or equal to a modulation order of data transmitted in a subframe reserved by the first channel reservation signal, and a code rate of the data transmitted in the subframe of the second channel reservation signal is less than or equal to a code rate of the data transmitted in the subframe reserved by the first channel reservation signal.

In this optional implementation, the modulation order and the code rate are decreased, so that a decoding success rate of a channel reservation signal receiving party for the second channel reservation signal can be increased.

In any one of the first aspect or the optional implementations of the first aspect, optionally, the method may further include: sending, by the base station, a configuration message to a target terminal. Correspondingly, in any one of the second aspect or the optional implementations of the second aspect, optionally, the sending unit may be further configured to send a configuration message to a target terminal.

The configuration message includes a quantity r of OFDM symbols in a target subframe that carry the channel reservation signal and a quantity R of OFDM symbols in the target subframe that are used to carry control data, to instruct the target terminal to start receiving/demodulating service data from an $(R+r+1)^{th}$ OFDM symbol in the target subframe. The target subframe is a subframe that carries the channel reservation signal, and both R and r are integers greater than or equal to 1.

In this optional implementation, the base station needs to send, to the target terminal, the quantity r of OFDM symbols in the target subframe that carry the channel reservation signal, to indicate that the base station uses r OFDM symbols to carry the channel reservation signal, that is, the service data is carried starting from the $(R+r+1)^{th}$ OFDM symbol. The target terminal needs to start receiving/parsing the service data from the $(R+r+1)^{th}$ OFDM symbol.

In any one of the first aspect or the optional implementations of the first aspect, optionally, before the sending, by the base station, a channel reservation signal on the unlicensed channel, the method may further include: performing, by the base station, sample-rate conversion on the channel reservation signal, to obtain a target signal, where a sampling rate of the target signal is a sampling rate of an LAA signal. In this case, the sending, by the base station, a channel reservation signal on the unlicensed channel may include: sending, by the base station, the target signal on the unlicensed channel.

Correspondingly, in any one of the second aspect or the optional implementations of the second aspect, optionally, the base station may further include: a conversion unit, configured to: before the sending unit sends the channel reservation signal on the unlicensed channel, perform sample-rate conversion on the channel reservation signal, to obtain a target signal, where a sampling rate of the target signal is a sampling rate of an LAA signal. In this case, the sending unit may be specifically configured to send the target signal on the unlicensed channel.

In this optional implementation, co-hardware sending of the LAA signal and the channel reservation signal can be implemented, that is, the LAA signal and the channel reservation signal can share a radio frequency link in a time division multiplexing manner. This can save hardware resources and reduce costs.

In any one of the first aspect or the optional implementations of the first aspect, optionally, the system signal is a WiFi signal, and the method may further include: sending, by the base station, a request to send (RTS) frame to a target terminal. Correspondingly, in any one of the second aspect or the optional implementations of the second aspect, optionally, the system signal is a WiFi signal, and the sending unit may be further configured to send a request to send RTS frame to a target terminal.

A receiver Media Access Control MAC address field of the RTS frame is used to mark a MAC address of a WiFi chip of the target terminal, so that the terminal broadcasts a clear to send clear to send (CTS) frame, and information used to indicate the to-be-reserved duration is marked in the CTS frame, so that a device that receives the CTS frame does not send data in the to-be-reserved duration.

This optional implementation provides a mechanism in which the base station sends the RTS frame to the target terminal. Devices (including a terminal, a base station, and the like) around the target terminal can receive the CTS frame. After receiving the CTS frame, these devices do not send data in the to-be-reserved duration. This can reduce interference caused by the surrounding devices to the target terminal, and further improve communication quality of communication between the base station in the LAA system and the target terminal.

In any one of the first aspect or the optional implementations of the first aspect, optionally, the system signal is a WiFi signal, the to-be-reserved duration is T, a largest duration reserved by the combination of the WiFi signal preamble and the signal field is a, and a largest duration reserved by the WiFi control frame is b. In this case, the sending, by the base station, a channel reservation signal on the unlicensed channel may include but is not limited to any one of the following several cases:

When T≤a, the base station sends, on the unlicensed channel, one group of channel reservation signals represented by the combination of the WiFi signal preamble and the signal field, or one group of channel reservation signals represented by the WiFi control frame.

When a<T≤b, the base station sends, on the unlicensed channel, a plurality of groups of channel reservation signals represented by the combination of the WiFi signal preamble and the signal field, or one group of channel reservation signals represented by the WiFi control frame.

When T>b, the base station sends, on the unlicensed channel, a plurality of groups of channel reservation signals represented by the combination of the WiFi signal preamble and the signal field, or a plurality of groups of channel reservation signals represented by the WiFi control frame, or one or more groups of channel reservation signals represented by the combination of the WiFi signal preamble and the signal field and one or more groups of channel reservation signals represented by the WiFi control frame.

Correspondingly, in any one of the second aspect or the optional implementations of the second aspect, optionally, the system signal is a WiFi signal, the to-be-reserved duration is T, a largest duration reserved by the combination of the WiFi signal preamble and the signal field is a, and a largest duration reserved by the WiFi control frame is b. In this case, the sending unit is specifically configured to:

when T≤a, send, on the unlicensed channel, one group of channel reservation signals represented by the combination of the WiFi signal preamble and the signal field, or one group of channel reservation signals represented by the WiFi control frame;

when a<T≤b, send, on the unlicensed channel, a plurality of groups of channel reservation signals represented by the combination of the WiFi signal preamble and the signal field, or one group of channel reservation signals represented by the WiFi control frame; or when T>b, send, on the unlicensed channel, a plurality of groups of channel reservation signals represented by the combination of the WiFi signal preamble and the signal field, or a plurality of groups of channel reservation signals represented by the WiFi control frame, or one or more groups of channel reservation signals represented by the combination of the WiFi signal preamble and the signal field and one or more groups of channel reservation signals represented by the WiFi control frame.

In the foregoing first aspect, optionally, the sending, by the base station, a channel reservation signal on the unlicensed channel may include:

sending, by the base station in a cell on/off mechanism, the channel reservation signal on the unlicensed channel on one or more OFDM symbols prior to a moment at which an LAA system to which the base station belongs enters a cell on state; or sending, by the base station in a cell on/off mechanism, the channel reservation signal on the unlicensed channel on one or more OFDM symbols following a moment at which an LAA system to which the base station belongs enters a cell on state; or sending, by the base station in a cell on/off mechanism, the channel reservation signal on the unlicensed channel on one or more OFDM symbols in a data region following a moment at which an LAA system to which the base station belongs enters a cell on state.

Correspondingly, in the foregoing second aspect, optionally, the sending unit may be specifically configured to:

send, in a cell on/off mechanism, the channel reservation signal on the unlicensed channel on one or more OFDM symbols prior to a moment at which an LAA system to which the base station belongs enters a cell on state; or send, in a cell on/off mechanism, the channel reservation signal on the unlicensed channel on one or more OFDM symbols following a moment at which an LAA system to which the base station belongs enters a cell on state; or send, in a cell on/off mechanism, the channel reservation signal on the unlicensed channel on one or more OFDM symbols in a data region following a moment at which an LAA system to which the base station belongs enters a cell on state.

This optional embodiment is applicable to a scenario in which an LAA system without a CCA function makes a channel reservation, that is, the unlicensed channel can be reserved in the LAA system without the CCA function. In addition, regardless of whether the LAA system has the CCA function, when an intra-system or an inter-system does not perform a high-throughput service, the base station can directly reserve the unlicensed channel according to this optional embodiment, without performing CCA.

In the foregoing first aspect, optionally, the sending, by the base station if a detection result of the CCA is that the unlicensed channel is idle, the channel reservation signal on the unlicensed channel may include: in a cross-carrier scheduling scenario, if the detection result of the CCA is that the unlicensed channel is idle, sending, by the base station, the channel reservation signal on the last one or more OFDM symbols of the unlicensed channel that is/are used to carry control data.

Correspondingly, in the foregoing second aspect, optionally, the sending unit is specifically configured to: if the detection result of the CCA is that the unlicensed channel is idle, send the channel reservation signal on the last one or more OFDM symbols of the unlicensed channel that is/are used to carry control data.

In this optional implementation, resources in a control region of the unlicensed channel are effectively utilized. In addition, spectral efficiency can be increased.

In the foregoing first aspect, optionally, the sending, by the base station if a detection result of the CCA is that the unlicensed channel is idle, the channel reservation signal on the unlicensed channel to reserve the unlicensed channel includes: if the detection result of the CCA is that the unlicensed channel is idle, and T1≥T2, after the CCA detection ends, sending, by the base station, the channel reservation signal on the unlicensed channel by deferring a T1-T2 duration, to reserve the unlicensed channel. Correspondingly, in the foregoing second aspect, optionally, the sending unit is specifically configured to: if the detection result of the CCA is that the unlicensed channel is idle, and T1≥ T2, after the CCA detection ends, send the channel reservation signal on the unlicensed channel by deferring a T1-T2 duration, to reserve the unlicensed channel. T1 is a delay of switching, by the LAA system to which the base station belongs, from uplink transmission to downlink transmission, and T2 is a time required by the base station to send the channel reservation signal to an air interface. This can ensure that the LAA system has switched from uplink transmission to downlink transmission when the base station sends the channel reservation signal on the air interface. It should be noted that, if the base station sends the channel reservation signal before the LAA system has switched from uplink transmission to downlink transmission, the channel reservation signal is destroyed, and therefore decoding of the channel reservation signal by a receive end is affected.

In the foregoing first aspect, optionally, the sending, by the base station if a detection result of the CCA is that the unlicensed channel is idle, the channel reservation signal on the unlicensed channel to reserve the unlicensed channel includes: if the detection result of the CCA is that the unlicensed channel is idle, and T1<T2, sending, by the base station, the channel reservation signal on the unlicensed channel to reserve the unlicensed channel.

Correspondingly, in the foregoing second aspect, optionally, the sending unit is specifically configured to: if the detection result of the CCA is that the unlicensed channel is idle, and T1<T2, send the channel reservation signal on the unlicensed channel to reserve the unlicensed channel.

T1 is a delay of switching, by the LAA system to which the base station belongs, from uplink transmission to downlink transmission, and T2 is a time required by the base station to send the channel reservation signal to an air interface. This can prevent another system from preempting the unlicensed channel.

According to a third aspect, a base station is provided, including a processor, a memory, and a system bus. The memory is configured to store a computer executable instruction, the processor and the memory are connected by using the system bus, and when the base station runs, the processor executes the computer executable instruction stored in the memory, so that the base station executes the method for sending a channel reservation signal provided in any one of the first aspect or the optional implementations of the first aspect.

The base station in this embodiment of the present invention can be configured to execute the method for sending a channel reservation signal described in the first aspect. Therefore, for a technical effect that can be achieved by the base station, refer to the technical effect achieved when the base station performs the method for sending a channel reservation signal in the first aspect. Details are not described herein again.

According to a fourth aspect, a readable medium is provided, including a computer executable instruction. When a processor of a base station executes the computer executable instruction, the base station executes the foregoing method for sending a channel reservation signal.

The readable medium provided in this embodiment of the present invention can be configured to execute the foregoing method for sending a channel reservation signal. Therefore, for a technical effect that can be achieved by the readable medium, refer to the foregoing method embodiment. Details are not described herein again.

According to a fifth aspect, a system for sending a channel reservation signal is provided. The system includes a base station and a plurality of terminals, and the base station may be the base station described in any one of the second aspect or the optional implementations of the second aspect.

The system for sending a channel reservation signal provided in this embodiment of the present invention includes the base station described in any one of the second aspect or the optional manners of the second aspect. Therefore, for a technical effect that can be achieved by the system, refer to the foregoing base station embodiment. Details are not described herein again.

BRIEF DESCRIPTION OF DRAWINGS

FIG. 6 (a) is a schematic diagram of a method for sending a channel reservation signal according to an embodiment of the present invention;

FIG. 6 (b) is a schematic diagram of another method for sending a channel reservation signal according to an embodiment of the present invention;

DESCRIPTION OF EMBODIMENTS

Figure 1:
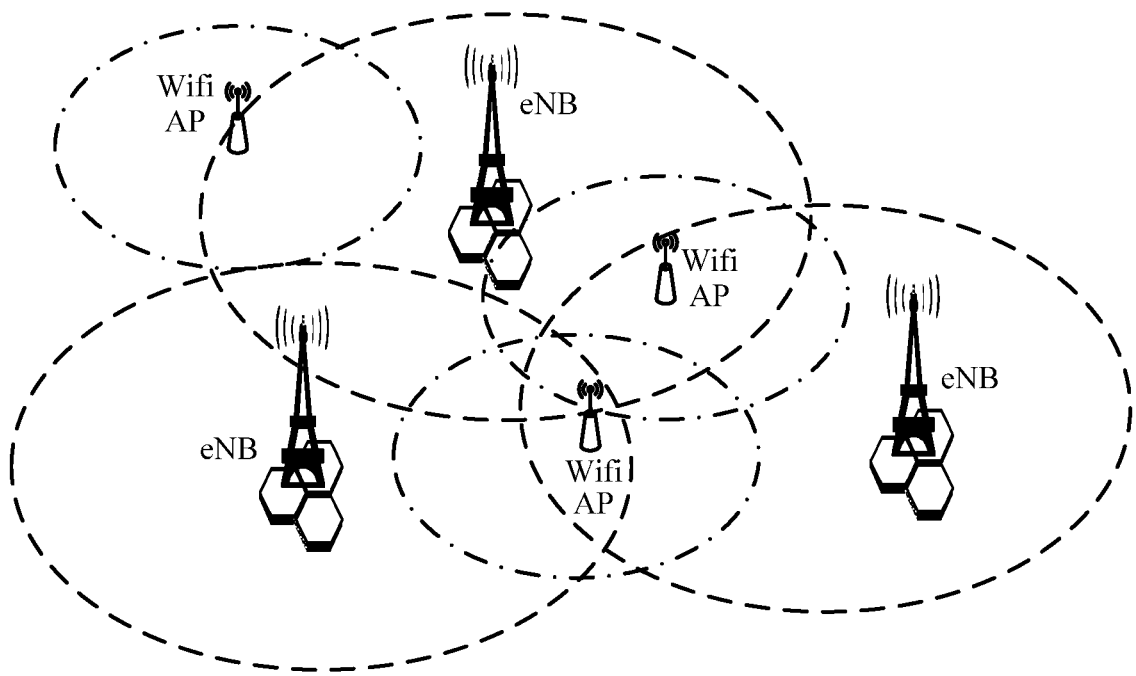
FIG. 1 is a schematic diagram of a system architecture in which an LAA system coexists with a WiFi system and to which technical solutions provided in embodiments of the present invention are applicable.

First, some terms in this application are explained, to help a reader to understand the technical solutions provided in this application.

(1) Intra-System and Inter-System

The technical solutions provided in the embodiments of the present invention are executed by a base station. Therefore, both the intra-system and the inter-system in the embodiments of the present invention are described with reference to an LAA system to which the base station belongs, and both the "intra-system" and the "inter-system" are systems that can use an unlicensed channel to communicate with a terminal. Specifically, the intra-system is an LAA system, and the inter-system is a non-LAA system, for example, may be a WiFi system or a radiolocation system. An LAA system and an intra-system of the LAA system are two different LAA systems. The terminal may be a user equipment (UE) in the LAA system, or a station (STA) in the WiFi system, or the like.

(2) Intra-System Signal and Inter-System Signal

The intra-system signal is a signal that is sent by an intra-system and that meets a frame format of the intra-system, for example, an LAA signal sent by an LAA system, specifically, an LAA signal sent by a base station in the LAA system. The inter-system signal is a signal that is sent by an inter-system and that meets a frame format of the inter-system, for example, a WiFi signal sent by a WiFi system, specifically, a WiFi signal sent by a WiFi AP or a WiFi STA in the WiFi system. The following mainly uses the WiFi signal sent by the WiFi AP as an example for description.

It should be noted that the intra-system can also send a signal that meets the frame format of the inter-system. For example, the LAA system can send a channel reservation signal. Specifically, the base station in the LAA system sends the channel reservation signal. The channel reservation signal meets a WiFi frame format. Although the LAA system can send the channel reservation signal meeting the WiFi frame format, that is, can send a WiFi signal, for the purpose of distinguishing, unless otherwise specified, a WiFi signal in the following description is a WiFi signal sent by the WiFi system, and a WiFi signal sent by the LAA system is directly represented by a channel reservation signal.

(3) LAA Data and WiFi Data

The WiFi data is data transmitted by a WiFi system to a terminal, and may specifically include WiFi control data, WiFi service data, and the like.

The LAA data is data transmitted by an LAA system to a terminal, and may specifically include LAA control data (such as a channel reservation signal), LAA service data, and the like.

(4) Other Terms

In this application, the terms "first", "second", and so on are intended to distinguish between different objects but do not indicate a particular order of the objects. For example, a first channel reservation signal and a second channel reservation signal are used for distinguishing between different channel reservation signals, instead of describing a particular order of the channel reservation signals.

Unless otherwise specified, the term "a plurality of" in this application means two or more. For example, a plurality of WIFI APs means two or more WIFI APs. The terms "system" and "network" in this application stand for a same meaning and may be used interchangeably.

The term "and/or" in this application describes only an association relationship for describing associated objects and denotes that three relationships may exist. For example, A and/or B may represent the following three cases: Only A exists, both A and B exist, and only B exists. In addition, the character "/" in this application generally indicates an "or" relationship between the associated objects. For example, A/B may be understood as A or B.

Second, a scenario and a network architecture to which the embodiments of the present invention are applicable are described.

The technical solutions provided in the embodiments of the present invention are applicable to a scenario in which an LAA system coexists with an intra-system or an inter-system. That the technical solutions are applicable to a scenario in which the LAA system coexists with a WiFi system is mainly used as an example for description.

A network element that is in the LAA system and is related to the embodiments of the present invention includes a base station, and a network element that is in the WiFi system and is related to the embodiments of the present invention includes a WIFI AP. In addition, the LAA system or the WiFi system in the embodiments of the present invention further includes a terminal. The terminal may be connected to the base station or the WiFi AP, to communicate with the base station or the WIFI AP.

FIG. 1 is a schematic diagram of a system architecture in which an LAA system coexists with a WiFi system and to which technical solutions provided in embodiments of the present invention are applicable. FIG. 1 shows deployment locations of a plurality of eNBs (base stations) and a plurality of WIFI APs, coverage of each eNB and each WIFI AP and a relationship thereof. There is a relatively high probability that co-channel interference occurs in overlapped coverage. Therefore, denser deployment in the LAA system and the WiFi system leads to a higher probability of co-channel interference. It should be noted that FIG. 1 is only a schematic diagram of a system architecture to which the embodiments of the present invention are applicable, instead of a limitation to an applicable scenario of the embodiments of the present invention.

Then, relevant technologies used in the embodiments of the present invention are simply described.

(1) Cell on/Off Mechanism and Listen Before Talk (LBT) Mechanism

Currently, to implement coexistence of an LAA system and a WiFi system, a base station in the LAA system usually performs channel detection on an unlicensed channel by using the following two mechanisms: duty cycle-based detection (or referred to as channel load detection), that is, the cell on/off mechanism; and clear channel assessment, that is, the LBT mechanism.

For the cell on/off mechanism, the base station first detects load levels of a group of unlicensed channels in one cell on/off period, then selects an unlicensed channel with a lowest load ratio, and determines, according to a duty cycle detection result of the unlicensed channel with the lowest load ratio, an on/off proportion of the LAA system, that is, a scheduling duration of the base station in one cell on/off period. The scheduling duration is usually more than dozens of milliseconds (ms). In the cell on/off mechanism, the LAA system may support CCA, or may not support CCA.

For the LBT mechanism, each time before the base station sends a data packet, the base station starts CCA one time. If a detection result of the CCA is that there is no collision (that is, an unlicensed channel is idle), the base station may send the data packet; or if a detection result of the CCA is that there is collision (that is, the unlicensed channel is not idle), the base station selects a random number to extend the CCA, and does not send the data packet until an idle time corresponding to an extended duration is accumulatively detected. For example, if selecting a random number N, the base station performs CCA again in at least N*CCA detection durations, and determines, based on a detection result, whether to send the data packet, that is, whether to occupy the unlicensed channel.

(2) WiFi Physical Frame Structure, that is, a Frame Format of a Physical Layer Convergence Procedure Protocol Data Unit (PPDU)

Figure 2:
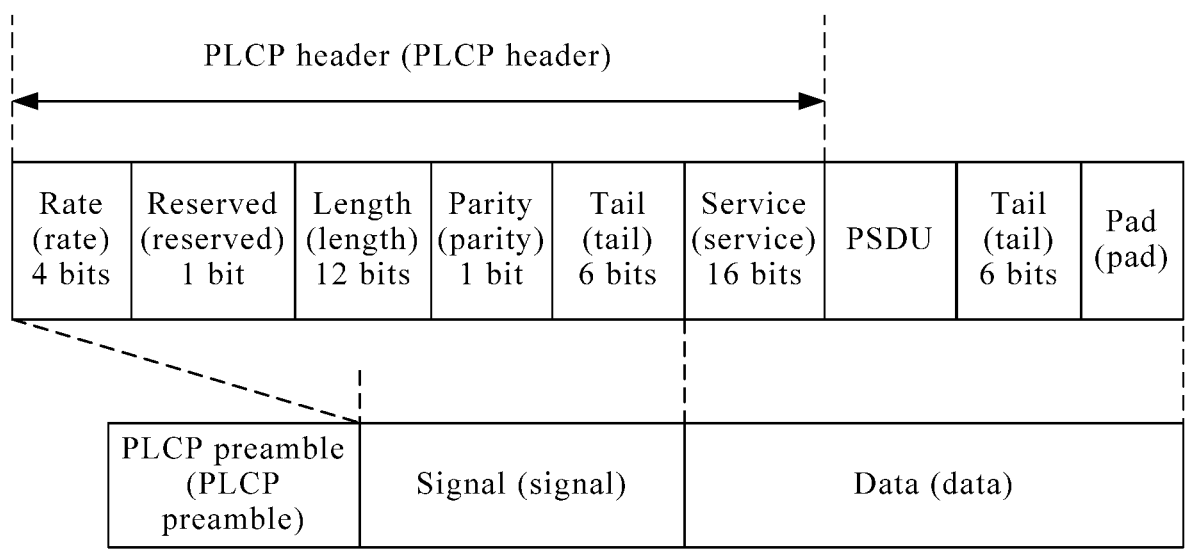
FIG. 2 is a schematic diagram of a WiFi physical frame structure.

Referring to FIG. 2, FIG. 2 is a schematic diagram of a WiFi physical frame structure. In a representation manner in FIG. 2, the WiFi physical frame structure may include a physical layer convergence procedure (PLCP) preamble, a signal field, and a data field. In another representation manner in FIG. 2, the WiFi physical frame structure may include a PLCP preamble, a PLCP header, a physical layer convergence procedure service data unit (PSDU), a tail field, and a pad field.

The PLCP header includes a rate field, a reserved field, a length field, a parity field, a tail field, and a service field. From the perspective of modulation, the rate field, the reserved field, the length field, the parity field, and the tail field form an independent orthogonal frequency division multiplexing (OFDM) symbol, denoted as the signal field. The service field in the PLCP header, the PSDU, the tail field, and the optional pad field are together denoted as the data field.

It should be noted that, FIG. 2 further shows quantities of bits occupied by some fields. The quantities of bits occupied by the some fields are only used as an example and do not limit the present disclosure.

(3) WiFi Control Frame Structure

A WiFi control frame includes a request to send (RTS) frame, a clear to send (CTS) frame, or the like. It should be noted that, the WiFi control frame throughout the specification is the RTS frame or the CTS frame.

Figure 3:
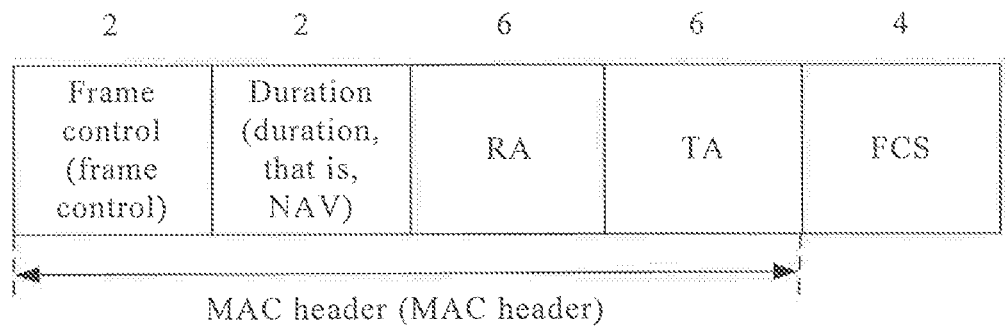
FIG. 3 is a schematic structural diagram of an RTS frame.

Referring to FIG. 3, FIG. 3 is a schematic structural diagram of an RTS frame. The RTS frame shown in FIG. 3 includes a media access control (MAC) header and a frame check sequence (FCS). The MAC header includes a frame control field, a duration field, a receiver address (or receiving station address, RA) field, and a transmitter address (or transmitting station address, TA) field. Quantities of bytes occupied by these fields may be 2, 2, 6, 6, and 4, that is, an RTS frame format generally occupies 20 bytes.

Figure 4:
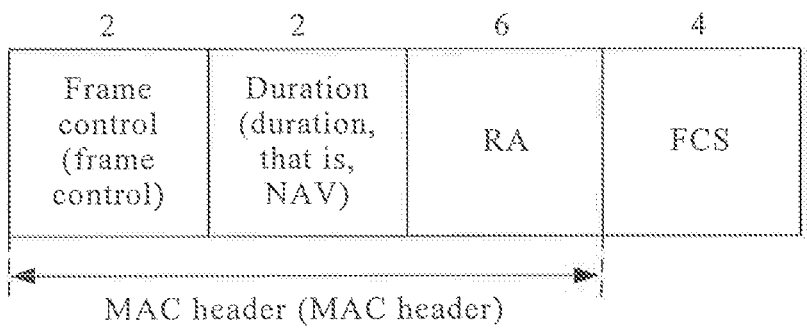
FIG. 4 is a schematic structural diagram of a CTS frame.

Referring to FIG. 4, FIG. 4 is a schematic structural diagram of a CTS frame. The CTS frame shown in FIG. 4 includes a MAC header and an FCS. The MAC header includes a frame control field, a duration field, and an RA field. Quantities of bytes occupied by these fields may be 2, 2, 6, and 4, that is, the CTS frame generally occupies 14 bytes.

It should be noted that, the duration field in the RTS frame and the CTS frame is used to record a value of a network allocation vector (NAV), that is, a channel occupancy duration. Therefore, during specific implementation, the duration field may be referred to as an NAV field.

The following describes the technical solutions provided in the embodiments of the present invention by using examples with reference to the accompanying drawings in the embodiments of the present invention. Apparently, the described embodiments are only some rather than all of the embodiments of the present invention. All other embodiments obtained by a person of ordinary skill in the art based on the embodiments of the present invention without creative efforts shall fall within the protection scope of the present disclosure. It should be noted that, the embodiments in this application and features of the embodiments may be mutually combined when they do not conflict with each other.

Figure 5:
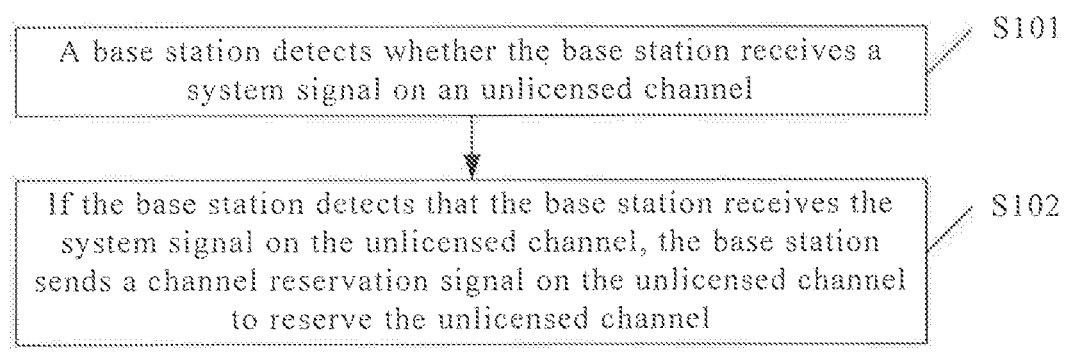
FIG. 5 is a flowchart of a method for sending a channel reservation signal according to an embodiment of the present invention.

Referring to FIG. 5, FIG. 5 is a flowchart of a method for sending a channel reservation signal according to an embodiment of the present invention. The method shown in FIG. 5 includes the following steps S101 and S102.

S101: A base station detects whether the base station receives a system signal on an unlicensed channel.

Optionally, step S101 may include: if the base station needs to occupy the unlicensed channel, detecting, by the base station in a preset time segment, whether the base station receives the system signal on the unlicensed channel. Optionally, step S101 may include: if the base station needs to occupy the unlicensed channel, detecting, by the base station when an LAA system to which the base station belongs enters a cell off state or performs CCA, whether the base station receives the system signal on the unlicensed channel.

That the base station needs to occupy the unlicensed channel may be understood as follows: The base station needs to communicate, by using the unlicensed channel, with a terminal connected to the base station. That the base station detects, on the unlicensed channel, whether the base station receives the system signal may be understood as follows: The base station detects, on a frequency corresponding to the unlicensed channel, whether the base station receives the system signal. The system signal may be an intra-system signal or an inter-system signal.

An example in which the system signal is a WiFi signal is used. The base station may detect a WiFi signal preamble to determine whether the base station receives the WiFi signal. Specifically, it may be learned, according to the 802.11 protocol, that the WiFi signal preamble is a fixed frequency domain sequence. Therefore, the base station may correlate a signal received on the unlicensed channel with the fixed frequency domain sequence. If a correlation peak exists, it is considered that the WiFi signal preamble exists, that is, it is detected that the WiFi signal has been received.

In an optional implementation, the method may further include: after detecting the WiFi signal preamble, detecting, by the base station, a length field in a PLCP header. In this way, the base station can determine a duration of a current frame of the WiFi signal. In this way, in step S102, the base station may send a channel reservation signal after the current frame of the WiFi signal ends, to prevent WiFi service data in the current frame from causing interference to subsequent LAA service data.

In another optional implementation, the method may further include: after detecting the WiFi signal preamble, detecting, by the base station, an NAV field in a MAC header. Because in a WiFi system, one data transmission process may include a plurality of data exchange processes, for example, exchange processes in which a WIFI AP sends a data packet and receives a corresponding acknowledgement (ACK) feedback. The NAV field is used to mark a channel occupancy duration in one data transmission process. In this way, in step S102, the base station may send a channel reservation signal after one data transmission process of the WiFi signal ends, to prevent WiFi service data transmitted in this data transmission process from causing interference to subsequent LAA service data.

S102: If the base station detects that the base station receives the system signal on the unlicensed channel, the base station sends a channel reservation signal on the unlicensed channel to reserve the unlicensed channel.

That the base station detects that the base station receives the system signal on the unlicensed channel indicates that an intra-system or an inter-system is deployed around the LAA system to which the base station belongs. That is, another base station, a WiFi AP, or the like is deployed around the base station, and the intra-system or the inter-system occupies the unlicensed channel at a current moment.

Step S102 may include: if the base station detects that the base station receives the system signal on the unlicensed channel, sending, by the base station, the channel reservation signal on the unlicensed channel to a network element (for example, a WIFI AP or another base station) in a system to which the system signal belongs, to reserve the unlicensed channel. The channel reservation signal carries a to-be-reserved duration. The "to-be-reserved duration" is a duration occupied by LAA service data that needs to be sent this time.

The channel reservation signal meets a WiFi frame format. During specific implementation, a WiFi control frame may be used to represent the channel reservation signal, and specifically, an NAV field is used to mark a part or all of the to-be-reserved duration. Alternatively, a combination of a WiFi signal preamble and a signal field may be used to represent the channel reservation signal, and specifically, a length field is used to mark a part or all of the to-be-reserved duration.

After step S102, the method may further include: after sending the channel reservation signal, sending, by the base station, LAA service data to a terminal in the to-be-reserved duration.

Optionally, after step S101, the method may further include: if the base station detects, in the preset time segment, that the base station receives the system signal on the unlicensed channel, directly occupying, by the base station, the unlicensed channel without sending the channel reservation signal to reserve the unlicensed channel. In addition, in this case, the base station may first perform CCA; and if a detection result of the CCA is that the unlicensed channel is idle, the base station sends the channel reservation signal to reserve the unlicensed channel. For a specific implementation, refer to a related embodiment in the specification. In this optional implementation, the following case can be avoided: The base station has actually received the system signal on the unlicensed channel, but because the base station cannot successfully parse the system signal, the base station incorrectly considers that the base station receives no system signal on the unlicensed channel; consequently, after the base station directly occupies the unlicensed channel, service data that is transmitted on the unlicensed channel by the system to which the system signal belongs causes interference to the LAA service data.

It should be noted that, the intra-system or the inter-system may be deployed around the LAA system to which the base station belongs. When the LAA system needs to occupy the unlicensed channel, if the unlicensed channel is being occupied by an intra-system or an inter-system, the intra-system or the inter-system may cause co-channel interference to the LAA system. In this case, after determining that the unlicensed channel is occupied by the intra-system or the inter-system, the base station may send the channel reservation signal to reserve the unlicensed channel. However, in some scenarios, for example, when no intra-system or inter-system exists around the LAA system to which the base station belongs, or the intra-system and the inter-system around the LAA system to which the base station belongs are out of service for a long time due to a fault or the like, the base station may directly occupy the unlicensed channel, that is, the base station may directly use the unlicensed channel to communicate with the terminal, without sending the channel reservation signal.

Optionally, to increase a reception success rate of a channel reservation signal receiving party, the base station may use a relatively low modulation scheme and a relatively low code rate to process the channel reservation signal. For example, a lowest modulation scheme specified in 802.11 is binary phase shift keying (BPSK), and a lowest code rate is 1/2.

According to the method for sending a channel reservation signal provided in this embodiment of the present invention, if the base station detects that the base station receives the system signal on the unlicensed channel, the base station sends the channel reservation signal on the unlicensed channel to reserve the unlicensed channel. Compared with the prior art in which a channel reservation signal is sent each time before an unlicensed channel needs to be occupied, some resources can be saved in this embodiment of the present invention.

In an optional embodiment, the system signal is a WiFi signal, the to-be-reserved duration is T, a largest duration reserved by the combination of the WiFi signal preamble and the signal field is a, and a largest duration reserved by the WiFi control frame is b. In this case, that the base station sends a channel reservation signal on the unlicensed channel may include the following several cases:

When T≤a, the base station sends, on the unlicensed channel, one group of channel reservation signals represented by the combination of the WiFi signal preamble and the signal field, or one group of channel reservation signals represented by the WiFi control frame.

When a<T≤b, the base station sends, on the unlicensed channel, a plurality of groups of channel reservation signals represented by the combination of the WiFi signal preamble and the signal field, or one group of channel reservation signals represented by the WiFi control frame.

When T>b, the base station sends, on the unlicensed channel, a plurality of groups of channel reservation signals represented by the combination of the WiFi signal preamble and the signal field, or a plurality of groups of channel reservation signals represented by the WiFi control frame, or one or more groups of channel reservation signals represented by the combination of the WiFi signal preamble and the signal field and one or more groups of channel reservation signals represented by the WiFi control frame.

This optional embodiment may be based on a cell on/off mechanism or an LBT mechanism.

One group of channel reservation signals includes one or more channel reservation signals. When one group of channel reservation signals includes a plurality of channel reservation signals, the plurality of channel reservation signals may be a plurality of consecutive channel reservation signals, or may be a plurality of channel reservation signals that are carried on a plurality of consecutive OFDM symbols.

When one group of channel reservation signals includes a plurality of channel reservation signals, the plurality of channel reservation signals are used to increase a reception success rate and a decoding success rate of a channel reservation signal receiving party (for example, a WIFI AP or another base station). However, a same group of channel reservation signals are used to reserve a same duration. The duration is a part or all of the to-be-reserved duration. For details, refer to examples in the following descriptions.

The combination of the WiFi signal preamble and the signal field uses a length field for duration reservation. As shown in FIG. 2, a length field occupies 12 bits, and according to the 802.11 protocol, a value of the length field ranges from 0 to 4095. An example in which a system bandwidth is 20 MHz is used. A length of one OFDM symbol is 4 us (microseconds). When a modulation scheme indicated by a rate field is BPSK and a code rate is 1/2, the length field indicates a largest duration which is specifically 5.464 ms and is approximately 5 ms. That is, a maximum of approximately 5 ms can be reserved by sending one group of channel reservation signals represented by the combination of the WiFi signal preamble and the signal field.

An RTS frame or a CTS frame uses an NAV field for duration reservation. As shown in FIG. 3 or FIG. 4, a duration field (that is, the NAV field) occupies 16 bits, and can reserve a maximum of 32,767 us, that is, approximately 32 ms. That is, a maximum of approximately 32 ms can be reserved by sending one group of channel reservation signals represented by the RTS frame or the CTS frame.

Therefore, in an example of this optional embodiment, a=5 ms, and b=32 ms. A person of ordinary skill in the art should understand that durations that can be reserved by the length field and the NAV field vary with the modulation scheme and the code rate that are indicated by the rate field. In this case, values of a and b should also vary accordingly. Details are not described herein.

In a scenario in which the base station sends one group of channel reservation signals, a duration reserved by the group of channel reservation signals is equal to the to-be-reserved duration. In a scenario in which the base station sends a plurality of groups of channel reservation signals, a sum of durations reserved by the plurality of groups of channel reservation signals is equal to the to-be-reserved duration. The durations reserved by all the groups of channel reservation signals may be the same or different. In addition, types of all the groups of channel reservation signals may be the same or different. For example, assuming that the base station needs to send two groups of channel reservation signals, the two groups of channel reservation signals may be both represented by the WiFi control frame, or may be both represented by the combination of the WiFi signal preamble and the signal field, or one group is represented by the WiFi control frame and the other group is represented by the combination of the WiFi signal preamble and the signal field.

In a scenario in which the base station sends a plurality of groups of channel reservation signals, theoretically, a time interval between sending of a current group of channel reservation signals by the base station and sending of a next group of channel reservation signals by the base station is equal to a duration reserved by the current group of channel reservation signals. The "time interval" is a time between a moment at which the sending of the current group of channel reservation signals ends and a moment at which the sending of the next group of channel reservation signals starts. That is, the base station first sends the current group of channel reservation signals, and then sends LAA service data to the terminal in the duration reserved by the current group of channel reservation signals. Next, the base station sends the next group of channel reservation signals, and then sends LAA service data to the terminal in a duration reserved by the next group of channel reservation signals. By analogy, this process proceeds until the sum of durations reserved by the plurality of groups of channel reservation signals that are sent is equal to the to-be-reserved duration. However, in practice, to ensure that the next group of channel reservation signals can be received by the WiFi system in a CCA process, generally, the "time interval" may be slightly shorter than the duration reserved by the current group of channel reservation signals.

Figure 6:
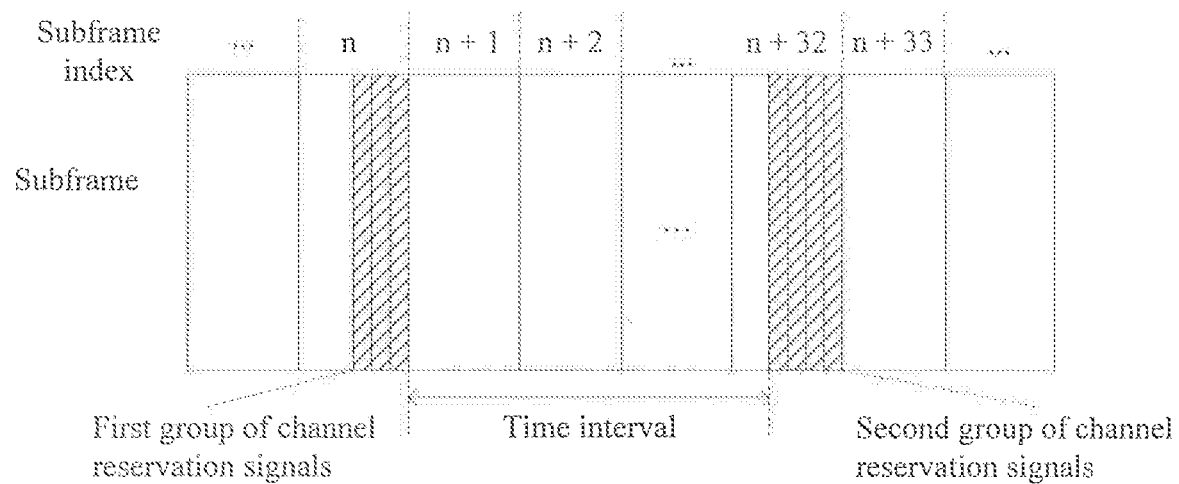
FIG. 6 is a schematic diagram 1 of sending a channel reservation signal according to an embodiment of the present invention.
Figure 6:
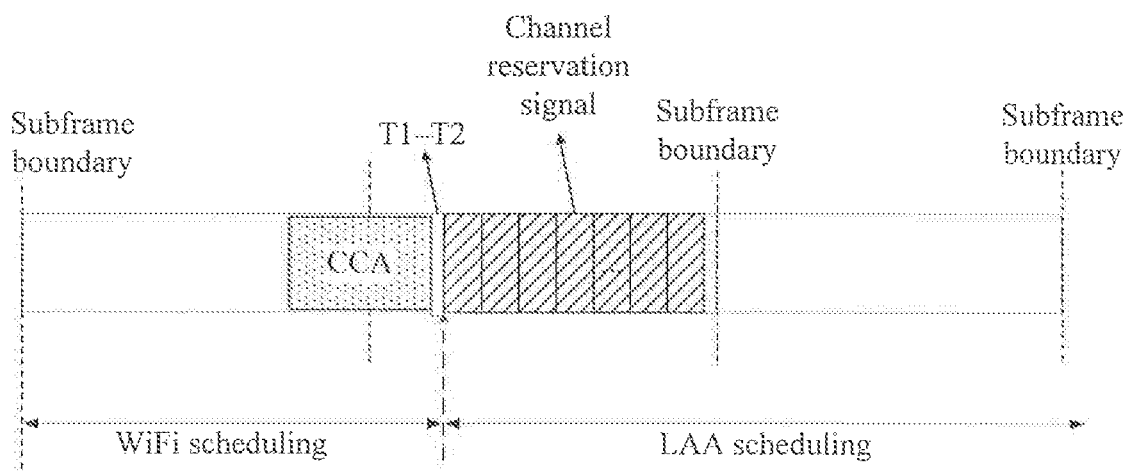
Figure 6:
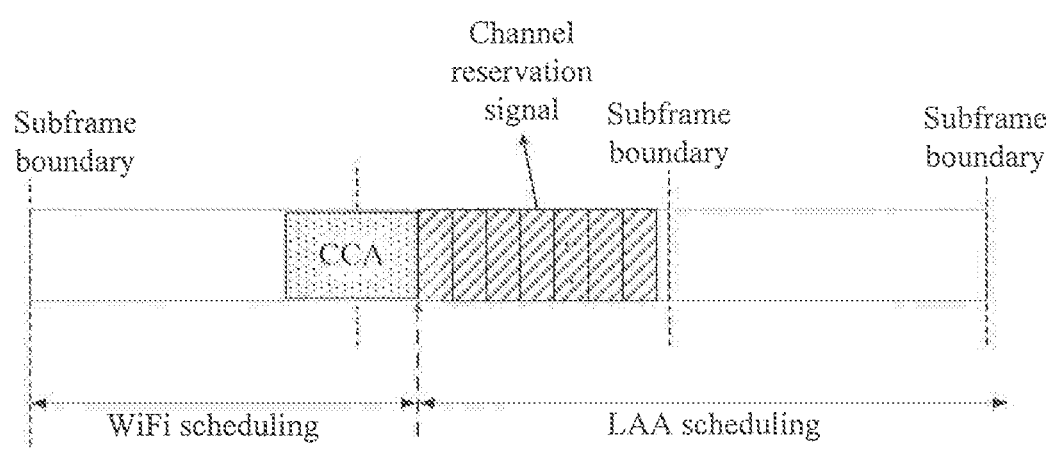

For example, as shown in FIG. 6, it is assumed that, the to-be-reserved duration is 37 ms, the base station sends two groups of channel reservation signals, a first group of channel reservation signals are represented by the WiFi control frame, a duration reserved by the first group of channel reservation signals is 32 ms, a second group of channel reservation signals are represented by the combination of the WiFi signal preamble and the signal field, a duration reserved by the second group of channel reservation signals is 5 ms, and a time interval between sending of the first group of channel reservation signals by the base station and sending of the second group of channel reservation signals by the base station is slightly shorter than 32 ms. A shaded rectangle in FIG. 6 may represent a channel reservation signal, or may represent an OFDM symbol. FIG. 6 is described based on a method for marking a duration reserved by a channel reservation signal in the following manner 3. Examples based on other manners are similar thereto, and are not enumerated herein.

It should be noted that, the following embodiments are all described by using an example in which the base station sends one group of channel reservation signals. A person of ordinary skill in the art should understand that, the following embodiments are also applicable to a scenario in which the base station sends a plurality of groups of channel reservation signals.

In an optional embodiment, that the base station sends a channel reservation signal on the unlicensed channel may include: sending, by the base station, a first channel reservation signal on the unlicensed channel, and sending a second channel reservation signal after a preset time segment expires. A modulation order of data transmitted in a subframe of the second channel reservation signal is less than or equal to a modulation order of data transmitted in a subframe reserved by the first channel reservation signal, and a code rate of the data transmitted in the subframe of the second channel reservation signal is less than or equal to a code rate of the data transmitted in the subframe reserved by the first channel reservation signal. This optional embodiment is applicable to the following scenario: After the base station sends the second channel reservation signal, there is still a duration left in the subframe occupied by the second channel reservation signal, and the base station schedules LAA service data in the duration left in the subframe.

Specifically, the base station may send a plurality of first channel reservation signals (which may be equivalent to the foregoing one group of channel reservation signals) on the unlicensed channel, and send a plurality of second channel reservation signals (which may be equivalent to the foregoing other group of channel reservation signals) after a reserved time segment (which may be equivalent to the foregoing time interval) expires.

Assuming that a group of first channel reservation signals reserves 3 ms (that is, three subframes), after sending the group of first channel reservation signals, the base station may send LAA service data in three subframes (including subframes 1, 2, and 3). Assuming that a moment of sending a group of second channel reservation signals is 2.5 ms (that is, an occupied subframe is the subframe 3), a modulation order and a code rate of LAA data sent in the subframe 3 (specifically, a first half subframe of the subframe 3) may be both less than or equal to a modulation order and a code rate of LAA service data sent in the subframes 1 and 2. For example, the modulation order of the LAA data sent in the subframes 1 and 2 is 64-quadrature amplitude modulation (QAM) and the code rate is 0.93, and the modulation order of the LAA service data sent in the subframe 3 is 16QAM and the code rate is 0.48.

Because the WiFi signal (which is the channel reservation signal herein) is directly used at a physical layer to cover physical downlink shared channel (PDSCH) data on the last OFDM symbol, a cyclic redundancy check (CRC) error may be caused in a higher order modulation and coding scheme (MCS). Therefore, in this embodiment, a decoding success rate of the channel reservation signal receiving party for the second channel reservation signal can be increased by decreasing the modulation order and the code rate. In addition, during specific implementation, the base station may notify, by using downlink control information (DCI), the terminal of MCS (including a modulation scheme, a modulation order, a code rate, and the like) of data in each subframe.

In an optional embodiment, step S102 may include: performing, by the base station, CCA if the base station detects that the base station receives the system signal on the unlicensed channel; and sending, by the base station if a detection result of the CCA is that the unlicensed channel is idle, the channel reservation signal on the unlicensed channel to reserve the unlicensed channel. This optional embodiment may be based on a cell on/off mechanism or an LBT mechanism.

Specifically, when using one group of channel reservation signals to reserve the unlicensed channel, the base station may perform CCA each time before the base station sends the group of channel reservation signals. When using a plurality of groups of channel reservation signals to reserve the unlicensed channel, the base station may perform CCA each time before sending one group of channel reservation signals. In addition, in this case, optionally, when a time interval between sending of a current group of channel reservation signals by the base station and sending of a next group of channel reservation signals by the base station is shorter than a duration reserved by the current group of channel reservation signals, the base station may perform CCA only before sending the first group of channel reservation signals in the plurality of groups of channel reservation signals.

In the prior art, a base station performs no operation before sending a channel reservation signal, and in this case, a system that may cause interference to the base station is probably in a sending state and therefore cannot receive the channel reservation signal. As a result, sending of the channel reservation signal makes no sense, and this not only wastes resources, but also fails to achieve objectives of channel reservation and co-channel interference avoidance. Compared with the prior art, in this optional embodiment, it can be ensured that the unlicensed channel is idle when the base station sends the channel reservation signal. That is, neither the intra-system nor the inter-system occupies the unlicensed channel, that is, the intra-system or the inter-system to which the system signal belongs is not in a sending state (that is, is in a receiving state). This increases a probability that the channel reservation signal sent by the base station is received by the intra-system or the inter-system to which the system signal belongs, and therefore increases a probability of achieving the objectives of channel reservation and co-channel interference avoidance.

Optionally, T1 is a delay of switching, by the LAA system to which the base station belongs, from uplink transmission to downlink transmission, and T1 is greater than or equal to 0. T2 is a time required by the base station to send the channel reservation signal to an air interface, and T2 is greater than or equal to 0. As shown in FIG. 6 (a), the sending, by the base station if a detection result of the CCA is that the unlicensed channel is idle, the channel reservation signal on the unlicensed channel to reserve the unlicensed channel may include: if the detection result of the CCA is that the unlicensed channel is idle, and T1≥T2, after the CCA detection ends, starting, by the base station, sending the channel reservation signal on the unlicensed channel by deferring a T1-T2 duration, to reserve the unlicensed channel. This can ensure that the LAA system has switched from uplink transmission to downlink transmission when the base station sends the channel reservation signal on the air interface. Alternatively, if the detection result of the CCA is that the unlicensed channel is idle, and T1<T2, the base station sends the channel reservation signal on the unlicensed channel to reserve the unlicensed channel. Specifically, as shown in FIG. 6 (b), if the detection result of the CCA is that the unlicensed channel is idle, and T1<T2, the base station immediately sends the channel reservation signal on the unlicensed channel. This can prevent another system from preempting the unlicensed channel. It should be noted that, this optional implementation may be applied to the LBT mechanism or the cell on/off mechanism. In addition, FIG. 6 (a) and FIG. 6 (b) only show reference numerals of accompanying drawings, and have no subordination relationship with FIG. 6.

During the CCA detection or after the CCA detection ends, the base station needs to switch from uplink transmission to downlink transmission. The uplink transmission is a process in which the base station receives the system signal, and the downlink transmission is a process in which the base station sends channel reservation data. If the channel reservation signal is pre-stored in a storage unit of the base station, T2 is a time required by the base station to obtain the channel reservation signal from the storage unit and transmit the channel reservation signal to the air interface. Alternatively, if the channel reservation signal is generated by a generation unit of the base station, T2 is a time required by the base station to obtain the channel reservation signal from the generation unit and transmit the channel reservation signal to the air interface. In addition, manners of obtaining T1 and T2 are not limited in this embodiment of the present invention.

The CCA provided in this embodiment of the present invention may be enhanced CCA, that is, an improvement is made to CCA provided in the prior art. The improvement may be decreasing a detection threshold for the CCA, and/or prolonging a detection duration, and/or prolonging a defer duration. Specifically, when the system signal is an inter-system signal, the detection threshold for the CCA may be set low enough, so that the base station can sense an inter-system signal with relatively low transmit power. In an optional implementation, a value of a detection threshold for the CCA is less than or equal to d, where d represents a smaller value between a detection threshold used by the base station to perform CCA for an intra-system and a detection threshold used by the base station to perform CCA for an inter-system. An example in which a system bandwidth is 20 MHz and the inter-system is a WiFi system is used. The detection threshold used by the base station to perform CCA for the intra-system is usually −52 dBm, the detection threshold used by the base station to perform CCA for the WiFi system is usually −72 dBm. In this case, the value of d may be −82 dBm, or even −92 dBm. A person of ordinary skill in the art should understand that the value of d varies accordingly when the system bandwidth varies and/or a type of the inter-system varies.

In this embodiment, the base station may prolong a detection duration of the CCA, so that detection precision of performing CCA by the base station is increased. Specifically, in an optional implementation, the detection duration of the CCA is greater than or equal to a larger value between a detection duration of CCA performed by the base station for an intra-system and a detection duration of CCA performed by the base station for an inter-system. An example in which the inter-system is a WiFi system is used. The detection duration of the CCA in this optional implementation is greater than or equal to a detection duration of CCA performed by a base station for the WiFi system in the prior art. For example, a defer duration of WiFi is 34 us or 43 us, and an optional defer duration of LAA may be set to 43 us or longer. It should be noted that, during one-time CCA, the base station first defers a period of time (that is, the optional defer duration of LAA), and then starts performing CCA. Generally, a process from a start moment of the deferring to a moment of outputting a CCA detection result is referred to as one-time CCA.

In this embodiment, the base station may prolong a defer duration, so that the detection duration of the CCA can be prolonged, to increase the detection precision of performing CCA by the base station. Specifically, in an optional implementation, a defer duration in a CCA process in this embodiment of the present invention is greater than or equal to a larger value between a defer duration of CCA performed by the base station for an intra-system and a defer duration of CCA performed by the base station for an inter-system. For a specific example, refer to the foregoing description. Details are not described herein again.

In an optional embodiment, that a base station detects whether the base station receives a system signal on an unlicensed channel in step S101 may include: detecting, by the base station in each detection period, whether the base station receives the system signal on the unlicensed channel. One detection period includes one or more detection durations. This optional embodiment may be based on a cell on/off mechanism or an LBT mechanism.

All the detection periods are the same. One detection period may include one or more cell off durations (that is, a duration occupied by one-time cell off) or CCA durations. The CCA duration is a duration occupied by the base station to perform one-time CCA, and the CCA duration may be a sum of a defer duration of the system to which the system signal belongs and a duration required by a process in which a counter is decreased to 0 in a CCA detection process. An example in which the system is a WiFi system is used. The defer duration is 34 us or 43 us.

Any two detection durations may be the same or different. One cell off duration or one CCA duration may include one or more detection durations. In addition, one detection duration may be distributed in a plurality of cell off durations or a plurality of CCA durations. Generally, a total detection duration (that is, a sum of all detection durations) in each detection period is greater than or equal to a preset threshold.

A larger value of the preset threshold indicates higher precision of detecting the system signal. The detection period and the detection duration may be both measured in a unit of second or in a unit of 100 milliseconds or millisecond.

Figure 7:
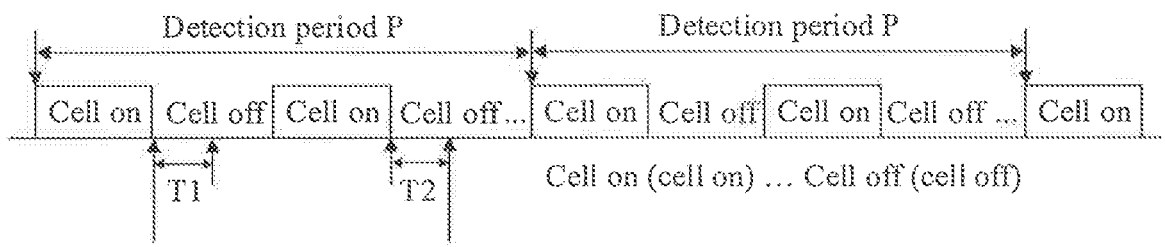
FIG. 7 is a schematic diagram of a relationship between a detection period P and a detection duration T according to an embodiment of the present invention.

FIG. 7 is a schematic diagram of a relationship between a detection period P and a detection duration T. FIG. 7 is described by using an example in which the base station detects, during cell off, whether the base station receives the system signal on the unlicensed channel. A horizontal axis represents a time axis, a time segment corresponding to a rectangular box indicates that the base station is in a cell on state, and a time segment between two rectangular boxes indicates that the base station is in a cell off state. One detection period P includes several cell off durations of which two cell off durations include durations T1 and T2, respectively. During specific implementation, T1 and T2 may be used as two detection durations, or T1+T2 may be used as one detection duration.

This optional embodiment provides a coarse-grained detection period and a fine-grained detection duration. The coarse-grained detection period can be used to avoid missing detection of the system signal, and the fine-grained detection duration can be used by the base station to quickly detect the system signal.

A technical solution for adjusting the detection period is further provided in this embodiment of the present invention. Specifically, the detection period may be adjusted according to the to-be-reserved duration. For example, when the system signal is a WiFi signal, if the base station has obtained a duration indicated by a length field or an NAV field, the base station may adjust the detection period according to the duration indicated by the length field or the NAV field. For example, if the duration indicated by the length field or the NAV field is greater than the detection period, the detection period may be prolonged, and an adjusted detection period may be used in next-time system signal detection.

In this optional embodiment, the performing, by the base station, CCA if the base station detects that the base station receives the system signal on the unlicensed channel may include: if the base station detects, in any one detection duration, that the base station receives the system signal on the unlicensed channel, stopping detection of the system signal in a detection period to which the detection duration belongs, and performing CCA.

In any one of the foregoing optional embodiments, the performing, by the base station, CCA may include: starting, by the base station in a cell on/off mechanism, performing CCA in N subframes prior to a moment at which an LAA system to which the base station belongs enters a cell on state, where a duration of the N subframes is greater than or equal to a maximum duration of one-time data sending in a system to which the system signal belongs.

The intra-system or the inter-system needs to perform channel contention between data transmission processes. Therefore, in the cell on/off mechanism, when the base station starts performing CCA at a moment before the LAA system to which the base station belongs enters the cell on state, the base station can definitely detect a moment at which the unlicensed channel is idle, where the duration between the moment and the LAA system to which the base station belongs enters the cell on state is greater than or equal to the maximum duration of one-time data sending in the system to which the system signal belongs. Upon detecting the moment, the base station immediately starts to send the channel reservation signal or starts to send the channel reservation signal on a next OFDM symbol, so that the base station can quickly preempt the unlicensed channel. It should be noted that, each moment at which the detection result of the CCA is that the unlicensed channel is idle is denoted as an "idle moment" in the accompanying drawings of this application.

For the cell on/off mechanism, a cell on duration and a cell off duration are relatively constant in a relatively long time, and may change only after a period of duty cycle measurement. That is, the cell on duration and the cell off duration are relatively constant. Therefore, a demarcation point between cell on and cell off is generally constant. In this embodiment, the demarcation point between cell on and cell off is changed. Specifically, a start moment at which the base station sends the channel reservation signal is used as a new demarcation point. Preferably, if the channel reservation signal is sent immediately when it is determined that the detection result of the CCA is that the channel is idle, a moment at which the detection result of the CCA is that the channel is idle is used as the new demarcation point.

An example in which the inter-system is a WiFi system is used. If the WiFi system is performing one data transmission process when the base station starts performing CCA, the data transmission process ends before an original demarcation point. In this case, the new demarcation point is before the original demarcation point. If the WiFi system is being between two data transmission processes when the base station starts performing CCA, an end moment of the second data transmission process is after the original demarcation point. Therefore, in this optional embodiment, the original demarcation point can be advanced or deferred.

Figure 8:
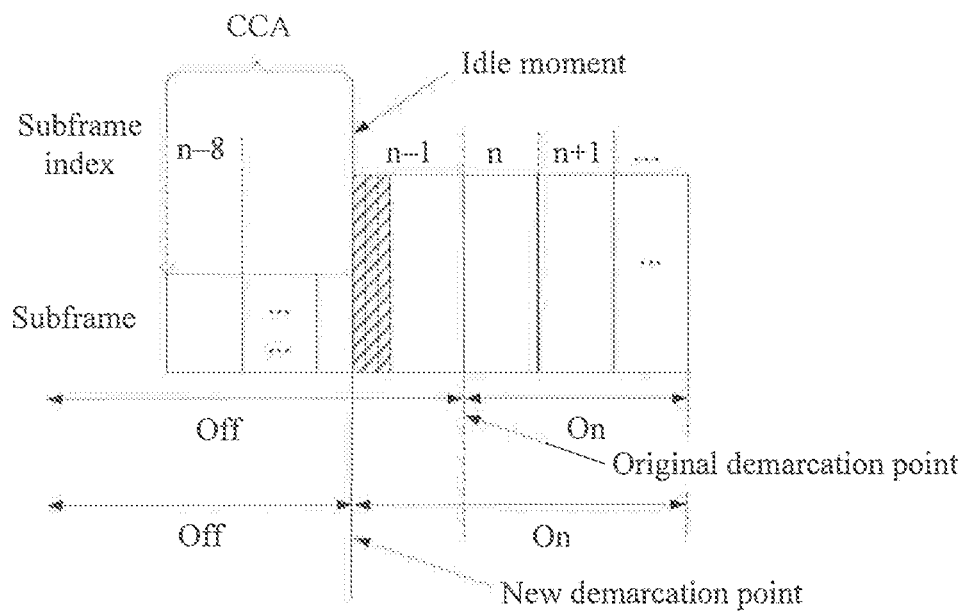
FIG. 8 is a schematic diagram of a method for determining a CCA trigger occasion according to an embodiment of the present invention.

An example in which the system signal is a WiFi signal is used. The duration of the N subframes represents a maximum duration of one-time data sending in the WiFi system, that is, a transmit opportunity (TXOP). A maximum value of the TXOP is usually set to 8 ms, that is, eight subframes. FIG. 8 is a schematic diagram of a CCA trigger occasion according to this embodiment. In FIG. 8, an original demarcation point between cell on and cell off (that is, the original demarcation point) is a subframe start boundary between an $(n-1)^{th}$ subframe and an $n^{th}$ subframe, and the base station starts to perform CCA in eight subframes prior to the demarcation point (that is, in an $(n-8)^{th}$ subframe). A shaded rectangle in FIG. 8 represents one group of channel reservation signals. FIG. 8 is described by using an example in which the new demarcation point is before the original demarcation point.

In an optional embodiment, that the base station sends a channel reservation signal on the unlicensed channel may include: sending, by the base station in a cell on/off mechanism, the channel reservation signal on the unlicensed channel on one or more OFDM symbols prior to a moment at which an LAA system to which the base station belongs enters a cell on state. A duration of the one or more OFDM symbols is within a duration of a cell on time sequence. Optionally, a plurality of same channel reservation signals are repeatedly sent on the one or more OFDM symbols.

Figure 9:
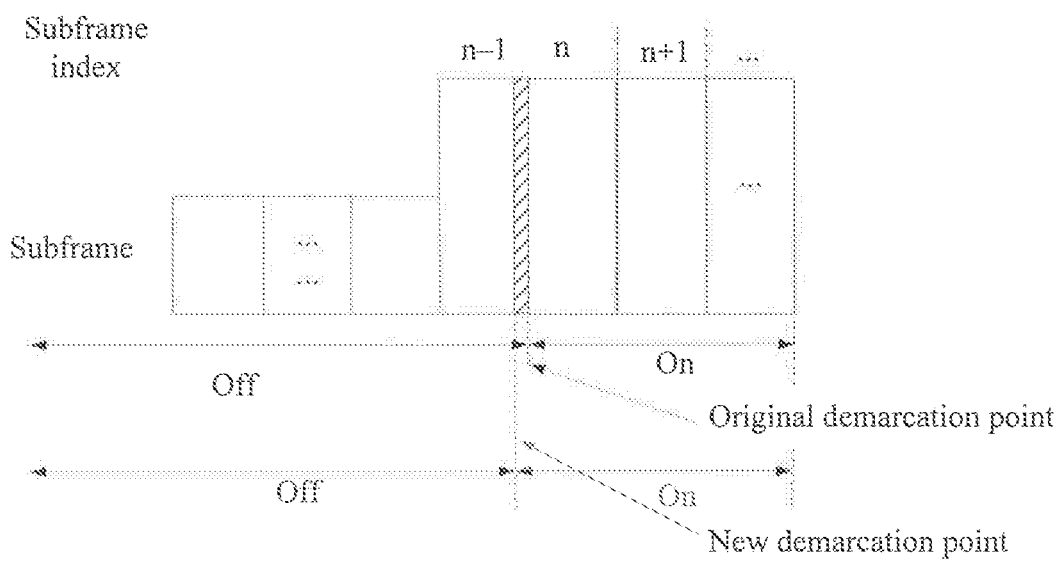
FIG. 9 is a schematic diagram 2 of sending a channel reservation signal according to an embodiment of the present invention.

This optional embodiment is applicable to a scenario in which no CCA is performed. That is, after detecting that the base station receives the system signal, the base station may directly send the channel reservation signal on the one or more OFDM symbols prior to a cell on start moment. In this optional embodiment, a demarcation point between cell on and cell off can be changed. Specifically, the demarcation point is advanced by the one or more OFDM symbols. FIG. 9 is a schematic diagram of sending a channel reservation signal according to this optional embodiment. FIG. 9 is described by using an example in which the channel reservation signal is sent on one OFDM symbol prior to the cell on start moment. A shaded rectangle represents one OFDM symbol. An original demarcation point and a new demarcation point are shown in FIG. 9.

It should be noted that, this optional embodiment is applicable to a scenario in which an LAA system without a CCA function makes a channel reservation, that is, an unlicensed channel can be reserved in the LAA system without the CCA function. In addition, regardless of whether the LAA system has the CCA function, when an intra-system or an inter-system does not perform a high-throughput service, the base station can directly reserve the unlicensed channel according to this optional embodiment, without performing CCA.

In an optional embodiment, that the base station sends a channel reservation signal on the unlicensed channel may include: sending, by the base station in a cell on/off mechanism, the channel reservation signal on the unlicensed channel on one or more OFDM symbols following a moment at which an LAA system to which the base station belongs enters a cell on state. A duration of the one or more OFDM symbols is within a duration of a cell on time sequence. Optionally, a plurality of same channel reservation signals are repeatedly sent on the one or more OFDM symbols.

This optional embodiment is applicable to a scenario in which no CCA is performed. That is, after detecting that the base station receives the system signal, the base station may directly send the channel reservation signal on the one or more OFDM symbols following a cell on start moment. Further, optionally, the channel reservation signal is sent on each OFDM symbol in one or more subframes following the cell on start moment, so that performance of receiving the channel reservation signal can be improved. In addition, in this further optional implementation, the LAA system can automatically correct a time sequence problem of hybrid automatic repeat request (HARQ), or the LAA system sets that no scheduling is performed in a subframe for sending the channel reservation signal. In this optional embodiment, a demarcation point between cell on and cell off is not changed.

In an optional embodiment, that the base station sends a channel reservation signal on the unlicensed channel may include: sending, by the base station in a cell on/off mechanism, the channel reservation signal on the unlicensed channel on one or more OFDM symbols in a data region following a moment at which an LAA system to which the base station belongs enters a cell on state. A duration of the one or more OFDM symbols is within a duration of a cell on time sequence. Optionally, a plurality of same channel reservation signals are repeatedly sent on the one or more OFDM symbols.

This optional embodiment is applicable to a scenario in which no CCA is performed. That is, after detecting that the base station receives the system signal, the base station may directly send the channel reservation signal on the one or more OFDM symbols in the data region following a cell on start moment. That is, no channel reservation signal may be sent on an OFDM symbol in a control region, so that a time sequence problem of HARQ can be avoided. Further, optionally, the channel reservation signal is repeatedly sent on each OFDM symbol in a data region in one or more subframes following the cell on start moment. In this optional embodiment, a demarcation point between cell on and cell off is not changed. For explanations of the OFDM symbol in the control region and the OFDM symbol in the data region, refer to the following description.

In any one of the foregoing optional implementations, further, optionally, in the cell on/off mechanism, if the cell on duration is greater than a maximum reservation duration supported by the channel reservation signal, one or more consecutive channel reservation signals may be successively sent in the cell on duration, to prevent another system from preempting the unlicensed channel in the cell on duration. For example, if the cell on duration is 40 ms, and the maximum reservation duration supported by the channel reservation signal is 32 ms, in an implementation in which the demarcation point is not changed, the base station may further reserve 8 ms after reserving 32 ms, to reserve the entire 40 ms cell on duration. It should be noted that, in this optional implementation, it may be considered that the one or more consecutive channel reservation signals for reserving the maximum reservation duration supported by the channel reservation signal are a group of channel reservation signals, and channel reservation signals for reserving a remaining duration of the cell on duration are another group of channel reservation signals. For content such as specific implementation of the two groups of channel reservation signals, refer to other examples in this specification. Details are not described herein.

In an optional embodiment, that the base station sends a channel reservation signal on the unlicensed channel may include: successively sending, by the base station, S channel reservation signals on the unlicensed channel, where a reservation field of an $s^{th}$ channel reservation signal is used to mark a sum of a to-be-reserved duration and a duration occupied by an $(s+1)^{th}$ channel reservation signal to an $S^{th}$ channel reservation signal, where $1 \leq s \leq S$, both S and s are integers, and the to-be-reserved duration is a duration required for data transmission on the unlicensed channel.

This optional embodiment may be based on a cell on/off mechanism or an LBT mechanism. This optional embodiment may be understood as follows: When the detection result of the CCA is that the unlicensed channel is idle, a plurality of channel reservation signals are sent immediately, and the channel reservation signal in this embodiment is unrelated to an OFDM symbol.

It should be noted that, in this optional embodiment, an end moment at which the base station sends the S channel reservation signals may be a next subframe start boundary, or may not be a next subframe start boundary. Modulation schemes and encoding modes of the S channel reservation signals may be different from each other. Optionally, the base station may adjust modulation and coding schemes of the reservation signals to adjust a duration occupied by the channel reservation signals, and therefore align the end moment with the next subframe start boundary as much as possible.

In the prior art, a base station sends a channel reservation signal at a fixed location in a subframe, for example, sends the channel reservation signal at a location such as a subframe start boundary or a third OFDM symbol following the subframe start boundary. In this optional embodiment, the following prior-art problem can be avoided: Because the base station sends the channel reservation signal at the fixed location, an unlicensed channel is preempted by an intra-system or an inter-system during a time segment from a moment at which a detection result of CCA is that the unlicensed channel is idle to the fixed location at which the channel reservation signal is sent. In this way, the LAA system to which the base station belongs can quickly reserve the unlicensed channel. In addition, when S>1, that is, when the base station sends a plurality of channel reservation signals, a reception success rate and a decoding success rate of a channel reservation signal receiving party for the channel reservation signals can be increased.

In this embodiment, the plurality of channel reservation signals may be understood as one group of channel reservation signals described in the foregoing optional embodiment. When the WiFi control frame is used to represent the channel reservation signal, the reservation field of the channel reservation signal is an NAV field; or when the combination of the WiFi signal preamble and the signal field is used to represent the channel reservation signal, the reservation field of the channel reservation signal is a length field. This embodiment is described by using an example in which the reservation field of the $s^{th}$ channel reservation signal is sufficient for marking the sum of the to-be-reserved duration and the duration occupied by the $(s+1)^{th}$ channel reservation signal to the $S^{th}$ channel reservation signal.

A duration occupied by the channel reservation signal is denoted by $T_0$, and the to-be-reserved duration is denoted by T. Therefore, durations marked by reservation fields of all the S channel reservation signals are as follows: A duration marked by a reservation field of a first channel reservation signal is $(S-1)*T_0+T$, a duration marked by a reservation field of a second channel reservation signal is $(S-2)*T_0+T$, ..., a duration marked by a reservation field of the $s^{th}$ channel reservation signal is $(S-s)*T_0+T$, ..., and a duration marked by a reservation field of the $S^{th}$ channel reservation signal is T.

Figure 10:
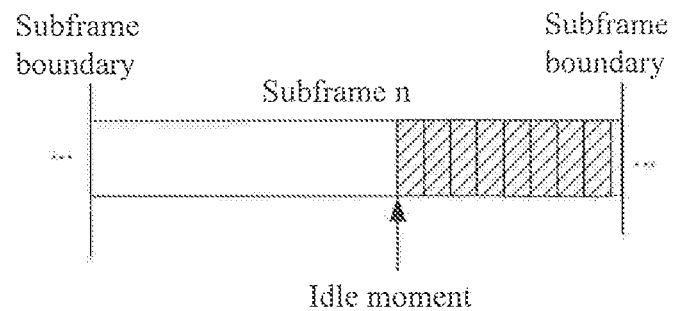
FIG. 10 is a schematic diagram 3 of sending a channel reservation signal according to an embodiment of the present invention.

FIG. 10 is a schematic diagram of sending a channel reservation signal according to an embodiment of the present invention. FIG. 10 is described by using an example in which S=8, that is, the base station successively sends eight channel reservation signals. A shaded rectangle in FIG. 10 represents one channel reservation signal.

In an optional embodiment, the sending, by the base station if a detection result of the CCA is that the unlicensed channel is idle, the channel reservation signal on the unlicensed channel may include: sending, by the base station, the channel reservation signal on each target OFDM symbol on the unlicensed channel, where the target OFDM symbols are P OFDM symbols starting from the first OFDM symbol following an OFDM symbol of a target moment, the target moment is a moment at which the base station determines that the detection result of the CCA is that the unlicensed channel is idle, and P is an integer greater than or equal to 1.

It is considered in this embodiment that, when the moment at which the detection result of the CCA is that the unlicensed channel is idle is a symbol boundary between an $i^{th}$ OFDM symbol and an $(i+1)^{th}$ OFDM symbol, an OFDM symbol of the moment at which the detection result of the CCA is that the unlicensed channel is idle is the $i^{th}$ OFDM symbol, where i is an integer. In addition, the moment at which the detection result of the CCA is that the unlicensed channel is idle may not be an OFDM symbol boundary. In this case, it is considered that the OFDM symbol of the moment is an incomplete OFDM symbol, and other OFDM symbols are complete OFDM symbols.

This optional embodiment may be understood as follows: The channel reservation signal is sent starting from the first OFDM symbol following an OFDM symbol occupied when the detection result of the CCA is that the unlicensed channel is idle, and the channel reservation signal is sent by using an OFDM symbol as a time unit.

In this embodiment, "a plurality of OFDM symbols" may be one group of OFDM symbols, where the group of OFDM symbols include a plurality of consecutive OFDM symbols; or may be a plurality of groups of OFDM symbols, where each group of OFDM symbols include one OFDM symbol or a plurality of consecutive OFDM symbols, and there is a time interval between different groups of OFDM symbols. For a related explanation of the time interval, refer to the related embodiment in the foregoing description. Details are not described herein again.

Figure 11:
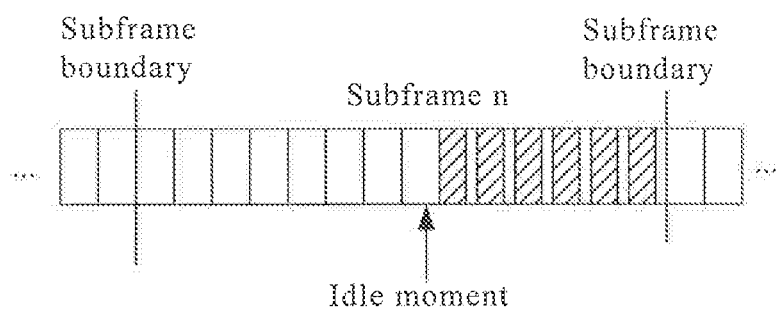
FIG. 11 is a schematic diagram 4 of sending a channel reservation signal according to an embodiment of the present invention.

FIG. 11 is a schematic diagram of sending a channel reservation signal according to an embodiment of the present invention. FIG. 11 is described by using an example in which the system signal is a WiFi signal. In addition, the target OFDM symbols are a plurality of consecutive OFDM symbols, and one channel reservation signal is sent on each target OFDM symbol. Each blank rectangle in FIG. 11 represents one OFDM symbol, one subframe includes 14 OFDM symbols, some blank rectangles are covered by shaded rectangles, and the shaded rectangle represents the channel reservation signal. It can be learned from FIG. 11 that one channel reservation signal cannot fill one OFDM symbol.

The following explains why one channel reservation signal cannot fill one OFDM symbol. In the LAA system, for a normal cyclic prefix (CP), a duration occupied by each OFDM symbol in the LAA system is approximately 71 us, a duration occupied by the first OFDM symbol in each timeslot is approximately 71.875 us, and a duration occupied by an OFDM symbol other than the first OFDM symbol in each timeslot is approximately 71.35 us. For an extended CP, a duration occupied by each OFDM symbol in the LAA system is approximately 83.33 us. An example in which a duration occupied by an OFDM symbol to which the normal CP is added is 71 us and a duration occupied by an OFDM symbol to which the extended CP is added is 83 us is used in the following descriptions.

A duration occupied by a WiFi control frame varies with a modulation scheme and a code rate that are indicated by a rate field in the WiFi control frame. When the modulation scheme is BPSK, and the code rate is 1/2, durations occupied by an RTS frame and a CTS frame are both the largest, and are 52 us and 44 us, respectively. Therefore, when the WiFi control frame is used to represent the channel reservation signal, a maximum value of a duration occupied by the channel reservation signal is 52 us or 44 us.

In addition, a duration occupied by a WiFi signal preamble is 16 us, and a signal field occupies one OFDM symbol of the WiFi system, that is, 4 us. Therefore, when a combination of the WiFi signal preamble and the signal field is used to represent the channel reservation signal, a duration occupied by the channel reservation signal is 20 us. Therefore, regardless of whether the WiFi control frame or the combination of the WiFi signal preamble and the signal field is used to represent the channel reservation signal, one channel reservation signal cannot fill one OFDM symbol.

Figure 12:
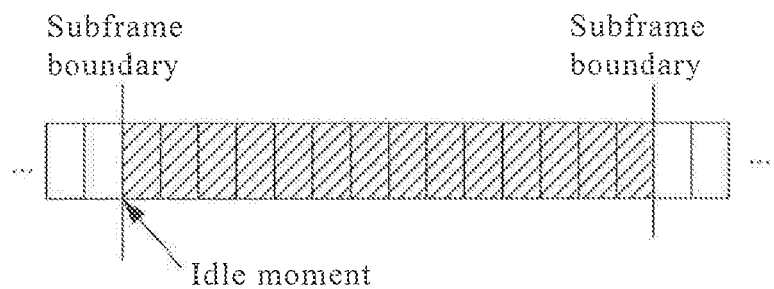
FIG. 12 is a schematic diagram 1 of determining a target OFDM symbol according to an embodiment of the present invention.
Figure 12:
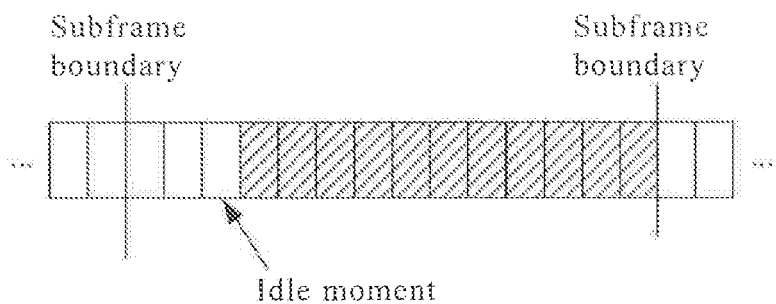

During specific implementation, LAA data or LAA service data may be sent or may not be sent in a subframe for sending the channel reservation signal. Based on a case in which the LAA data or the LAA service data is not sent in the subframe in which the channel reservation signal is located, the following lists several methods for determining a target OFDM symbol:

As shown in FIG. 12, if a plurality of complete OFDM symbols exist between the first OFDM symbol following the OFDM symbol occupied when the detection result of the CCA is that the unlicensed channel is idle, and the next subframe start boundary, the base station may use the plurality of OFDM symbols as the target OFDM symbols.

Figure 13:
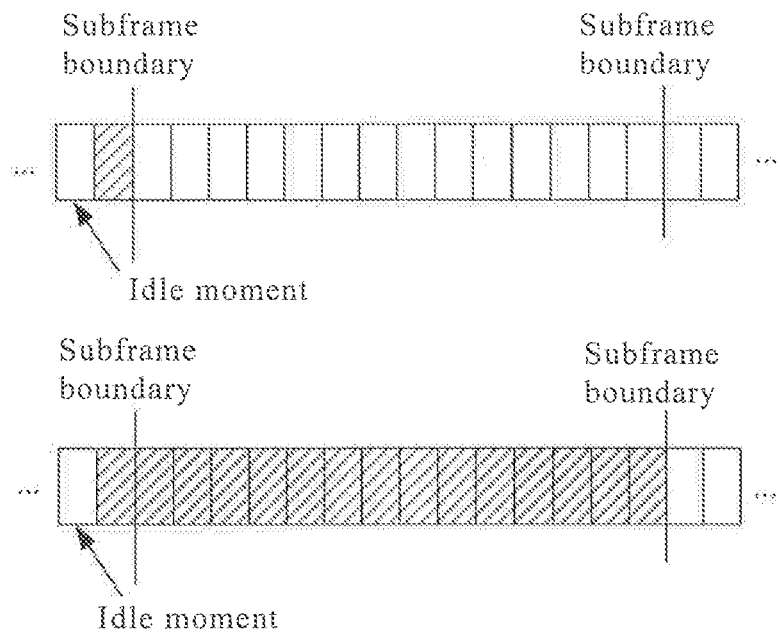
FIG. 13 is a schematic diagram 2 of determining a target OFDM symbol according to an embodiment of the present invention.

As shown in FIG. 13, if only one complete OFDM symbol exists between the first OFDM symbol following the OFDM symbol occupied when the detection result of the CCA is that the unlicensed channel is idle, and the next subframe start boundary, the OFDM symbol is used as the target OFDM symbol, or the OFDM symbol and a next subframe are used as the target OFDM symbols.

Figure 14:
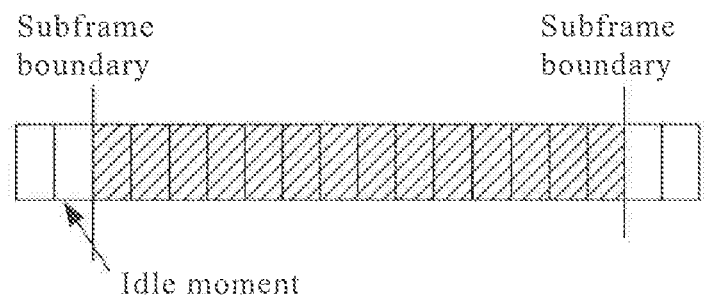
FIG. 14 is a schematic diagram 3 of determining a target OFDM symbol according to an embodiment of the present invention.

As shown in FIG. 14, if no complete OFDM symbol exists between the first OFDM symbol following the OFDM symbol occupied when the detection result of the CCA is that the unlicensed channel is idle, and the next subframe start boundary, OFDM symbols in a next subframe are used as the target OFDM symbols.

Each rectangle in FIG. 12 to FIG. 14 represents one OFDM symbol, and each shaded rectangle represents one target OFDM symbol. The methods for determining an OFDM symbol shown in FIG. 12 to FIG. 14 are all described by using an example in which the last target OFDM symbol is a subframe start boundary. This is not limited during specific implementation. For example, the base station may use, as the target OFDM symbols, a fixed quantity of OFDM symbols starting from the first OFDM symbol following the OFDM symbol occupied when the detection result of the CCA is that the unlicensed channel is idle.

Figure 15:
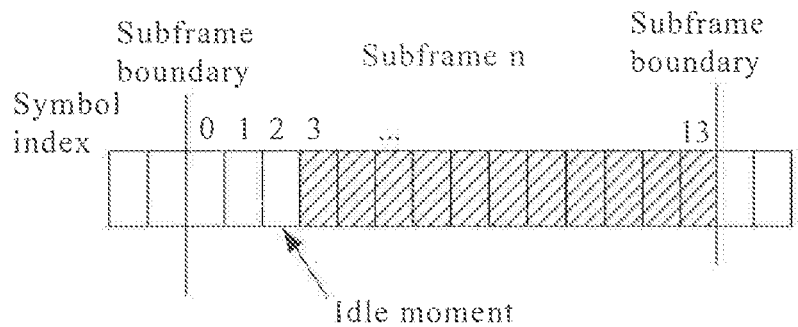
FIG. 15 is a schematic diagram 4 of determining a target OFDM symbol according to an embodiment of the present invention.

In an optional implementation, the plurality of OFDM symbols are a plurality of consecutive OFDM symbols, that is, the target OFDM symbols are a plurality of consecutive OFDM symbols. Target OFDM symbols shown in FIG. 15 are used as an example for description. In FIG. 15, in a process in which the base station performs CCA, on an OFDM symbol 2 (0 is a start symbol index in a subframe) in a subframe n, a detection result of the CCA is that the unlicensed channel is idle. In this case, the target OFDM symbols may be OFDM symbols 3 to 13 in the subframe n. In all the following examples in FIG. 16 to FIG. 19, the system signal is a WiFi signal, the duration occupied by the RTS frame is 52 us, and the to-be-reserved duration is 3 ms.

The following describes several different manners of marking a reservation field of a channel reservation signal.

Manner 1: A reservation field of the channel reservation signal sent on a $p^{th}$ target OFDM symbol is used to mark a duration left after the $p^{th}$ target OFDM symbol is occupied by the channel reservation signal, and a reservation field of the channel reservation signal sent on a $P^{th}$ target OFDM symbol is used to mark a sum of a to-be-reserved duration and a duration left after the $P^{th}$ target OFDM symbol is occupied by the channel reservation signal, where $1 \leq p < P$, and p is an integer.

The manner 1 may be understood as reserving according to an index of a target OFDM symbol. That is, durations reserved by channel reservation signals sent on different target OFDM symbols are different. Specifically, a duration reserved by the channel reservation signal sent on an OFDM symbol other than the last OFDM symbol is different from a duration reserved by the channel reservation signal sent on the last OFDM symbol.

In the manner 1, a reservation field of the channel reservation signal sent on each target OFDM symbol marks a duration left after the target OFDM symbol is occupied by the channel reservation signal. That is, the remaining duration of each target OFDM symbol is reserved. This can prevent the unlicensed channel from being preempted by an intra-system or an inter-system in the remaining duration of each target OFDM symbol. In addition, in the manner 1, the to-be-reserved duration can be accurately reserved by using the channel reservation signal sent on the last target OFDM symbol. In the manner 1, a channel reservation signal receiving party needs to receive and parse the channel reservation signal sent on the last target OFDM symbol, and then can avoid using the unlicensed channel according to the to-be-reserved duration.

Figure 16:
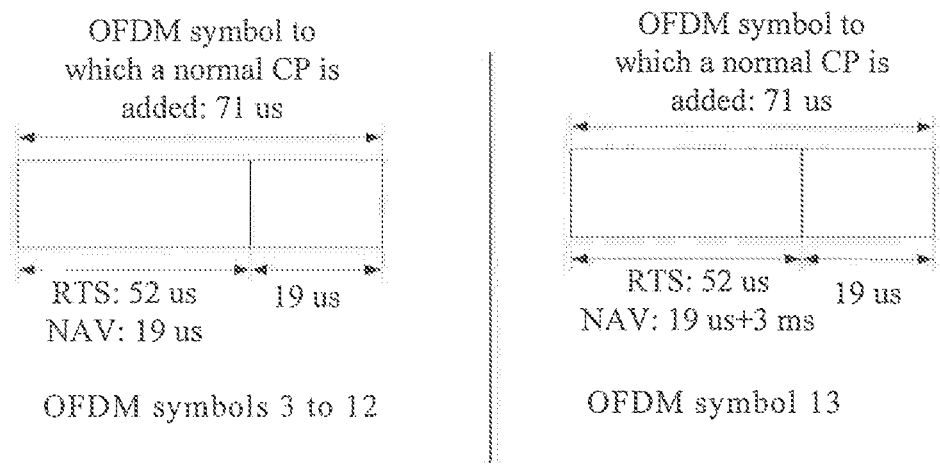
FIG. 16 is a schematic diagram 1 of a method for marking a reservation field according to an embodiment of the present invention.

Based on FIG. 15, when the RTS frame is used to represent the channel reservation signal, for a target OFDM symbol to which a normal CP is added, a duration left after the target OFDM symbol is occupied by the RTS frame is 71 us−52 us=19 us. In this case, as shown in FIG. 16, NAV fields in RTS frames on OFDM symbols 3 to 12 are marked as 19 us, and an NAV field in an RTS frame on an OFDM symbol 13 is marked as 19 us+3 ms.

Manner 2: A reservation field of each channel reservation signal sent on each target OFDM symbol is used to mark a sum of a to-be-reserved duration and a duration left after the target OFDM symbol is occupied by the channel reservation signal.

The manner 2 may be understood as uniform reserving. Durations reserved by channel reservation signals sent on different OFDM symbols are the same. Therefore, a reservation does not need to be made according to an index of an OFDM symbol, and implementation is simple. In addition, the unlicensed channel can be prevented from being preempted by an intra-system or an inter-system in the remaining duration of each OFDM symbol.

In the manner 2, the reservation field of the channel reservation signal sent on each target OFDM symbol marks the sum of the to-be-reserved duration and the duration left after the target OFDM symbol is occupied by the channel reservation signal. In this case, after receiving and successfully parsing the channel reservation signal sent on any target OFDM symbol, a channel reservation signal receiving party may no longer receive and/or parse the channel reservation signal sent on another target OFDM symbol. In addition, after successfully parsing the last target OFDM symbol, the receiving party can obtain accurate to-be-reserved duration.

Figure 17:
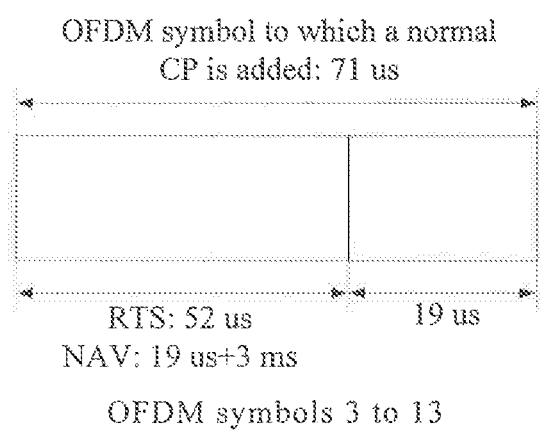
FIG. 17 is a schematic diagram 2 of a method for marking a reservation field according to an embodiment of the present invention.

Based on FIG. 15, when the RTS frame is used to represent the channel reservation signal, for a target OFDM symbol to which a normal CP is added, a duration left after the target OFDM symbol is occupied by the RTS frame is 19 us. In this case, as shown in FIG. 17, NAV fields in RTS frames on OFDM symbols 3 to 13 are marked as 19 us+3 ms.

Manner 3: A reservation field of the channel reservation signal sent on an $m^{th}$ target OFDM symbol is used to mark a sum of a to-be-reserved duration and (P−m)*OFDM symbol durations, where $1 \leq m \leq P$, and m is an integer.

The manner 3 may be understood as uniform reserving. Because durations reserved by channel reservation signals sent on different target OFDM symbols are different, a reservation needs to be made according to an index of an OFDM symbol. However, the durations reserved by the channel reservation signals sent on the different target OFDM symbols comply with a same rule, and implementation is simple. In addition, the unlicensed channel can be prevented from being preempted by an intra-system or an inter-system in the remaining duration of each OFDM symbol. In addition, because on any target OFDM symbol, a time segment from a start moment of the target OFDM symbol to an end moment of LAA service data (a transmission time segment of the LAA service data is the to-be-reserved duration) is reserved, the to-be-reserved duration can be accurately reserved on any target OFDM symbol.

In the manner 3, after receiving and successfully parsing the channel reservation signal sent on any target OFDM symbol, a channel reservation signal receiving party may no longer receive and/or parse the channel reservation signal sent on another target OFDM symbol. In addition, regardless of which target OFDM symbol is successfully parsed by the receiving party, an accurate to-be-reserved duration can be obtained.

Figure 18:
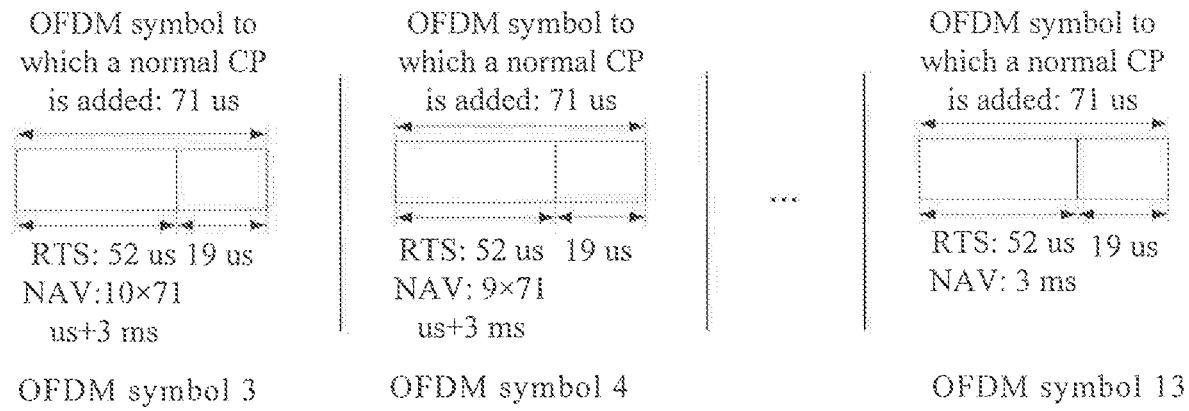
FIG. 18 is a schematic diagram 3 of a method for marking a reservation field according to an embodiment of the present invention.

Based on FIG. 15, an OFDM symbol 3 is the first target OFDM symbol, and so on. As shown in FIG. 18, when the RTS frame is used to represent the channel reservation signal, for a target OFDM symbol to which a normal CP is added, an NAV field in an RTS frame on the OFDM symbol 3 (that is, the first target OFDM symbol) is marked as (11−1)×71 us+3 ms; an NAV field in an RTS frame on an OFDM symbol 4 (that is, the second target OFDM symbol) is marked as (11−2)×71 us+3 ms; and by analogy, an NAV field in an RTS frame on an OFDM symbol 13 (that is, the eleventh target OFDM symbol) is marked as 3 ms.

In addition, during specific implementation, some features of the foregoing manners 1 to 3 may further be combined for use. For example, a combination of the manner 1 and the manner 3 or a combination of the manner 2 and the manner 3 may form a manner 4.

Manner 4: All the target OFDM symbols are divided into two parts; each target OFDM symbol in a current part complies with a rule for marking a channel reservation signal on a target OFDM symbol other than the last target OFDM symbol in the manner 1, or a rule for marking a channel reservation signal on each target OFDM symbol in the manner 2; and each target OFDM symbol in a next part complies with a rule for marking a channel reservation signal in the manner 3. A demarcation point for dividing all the target OFDM symbols into the two parts is not limited in this embodiment of the present invention.

In comparison with the manner 1, in a manner 4 formed by combining the manner 1 and the manner 3, the channel reservation signal receiving party can correctly obtain the to-be-reserved duration by means of parsing, provided that the receiving party receives any target OFDM symbol in the next part. Therefore, reception performance can be improved. In comparison with the manner 2, in a manner 4 formed by combining the manner 2 and the manner 3, the channel reservation signal receiving party can correctly reserve the to-be-reserved duration, provided that the receiving party receives any target OFDM symbol in the next part. Therefore, accuracy in reserving the to-be-reserved duration can be increased.

Based on FIG. 15, it is assumed that OFDM symbols 3 to 11 are used as a current part, and OFDM symbols 12 and 13 are used as a next part. When the RTS frame is used to represent the channel reservation signal, for a target OFDM symbol to which a normal CP is added, NAV fields in RTS frames on the OFDM symbols 3 to 11 are marked as 19 us or 19 us+3 ms; an NAV field in an RTS frame on the OFDM symbol 12 is marked as 71 us+3 ms; and an NAV field in an RTS frame on the OFDM symbol 13 is marked as 3 ms.

It should be noted that, there may be other combinations of the foregoing manners 1 to 4. The other combinations are not enumerated herein. In addition, in any one of the foregoing manners 1 to 4, for a target OFDM symbol to which an extended CP is added, a duration marked by an NAV field of the channel reservation signal that is represented by an RTS frame and that is sent on the OFDM symbol is similar thereto. In addition, when a CTS frame is used to represent the channel reservation signal, or a combination of a WiFi signal preamble and a signal field is used to represent the channel reservation signal, a duration marked by a reservation field of the channel reservation signal on the target OFDM symbol is similar thereto. Details are not described one by one herein.

Based on any one of the foregoing embodiments or optional implementations in which a channel reservation signal is carried on an OFDM symbol, optionally, when the system signal is a WiFi signal, the base station further sends padding information in a duration left after any one or more target OFDM symbols are occupied by the channel reservation signal (referred to as a "target channel reservation signal" below). The padding information may include but is not limited to any one piece of the following information (1) to (3).

It should be noted that, the padding information may be sent before or after the target channel reservation signal. The target channel reservation signal may be represented by the WiFi control frame, or by the combination of the WiFi signal preamble and the signal field.

(1) WiFi Control Frame

When the target channel reservation signal is represented by the combination of the WiFi signal preamble and the signal field, a padded WiFi control frame may be an RTS frame, or may be a CTS frame.

When the target channel reservation signal is represented by the WiFi control frame, the WiFi control frame is referred to as a first WiFi control frame, and a padded WiFi frame is referred to as a second WiFi control frame. In this case, the first WiFi control frame and the second WiFi control frame may be WiFi control frames of a same type, or may be WiFi control frames of different types. For example, regardless of whether the first WiFi frame is an RTS frame or a CTS frame, the second WiFi frame may be an RTS frame or a CTS frame. In addition, modulation schemes and code rates of the first WiFi frame and the second WiFi frame may be the same, or may be different.

Example 1

When the modulation scheme is BPSK, and the code rate is 3/4, a duration occupied by an RTS frame (that is, the first WiFi control frame) is 44 us. Based on the foregoing manner 1, for a target OFDM symbol to which a normal CP is added, a duration left after the target OFDM symbol is occupied by the RTS frame is 71 us−44 us=27 us. In this case, NAV fields in RTS frames on OFDM symbols 3 to 12 are marked as 27 us, and an NAV field in an RTS frame on an OFDM symbol 13 is marked as 27 us+3 ms.

Figure 19:
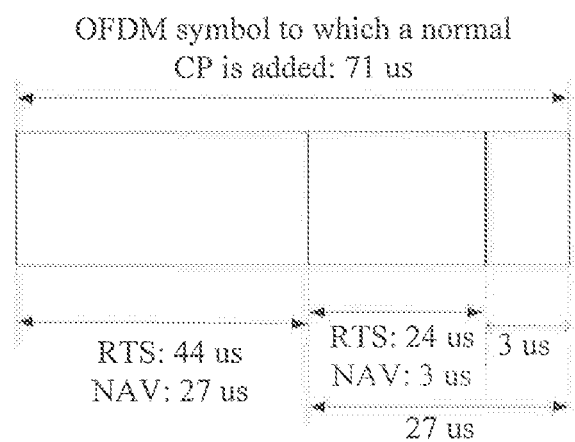
FIG. 19 is a schematic diagram 1 of a method for padding a remaining duration according to an embodiment of the present invention.

When the modulation scheme is 64-QAM, and the code rate is 2/3, a duration occupied by an RTS frame (that is, the second WiFi control frame) is 24 us. Based on the example 1, in this optional implementation, a duration (that is, 27 us) left after the first WiFi control frame is sent on the target OFDM symbol may be padded with the second WiFi control frame. After the padding, a duration left on the target OFDM symbol is 27−24=3 us. In this case, as shown in FIG. 19, an NAV field of the second WiFi control frame may be marked as 3 us, to prevent an unlicensed control channel from being preempted by an intra-system or an inter-system in the 3 us.

(2) Combination of a WiFi Signal Preamble and a Signal Field

A duration occupied by the combination of the WiFi signal preamble and the signal field is 20 us. Therefore, based on the example 1, in this optional implementation, as shown in FIG. 20, a duration (that is, 27 us) left after the first WiFi control frame is sent on the target OFDM symbol may be padded with the WiFi signal preamble and the signal field, to prevent an unlicensed control channel from being preempted by an intra-system or an inter-system in the 7 us.

(3) Combination of a WiFi Signal Preamble, a Signal Field, and Invalid Data

Figure 20:
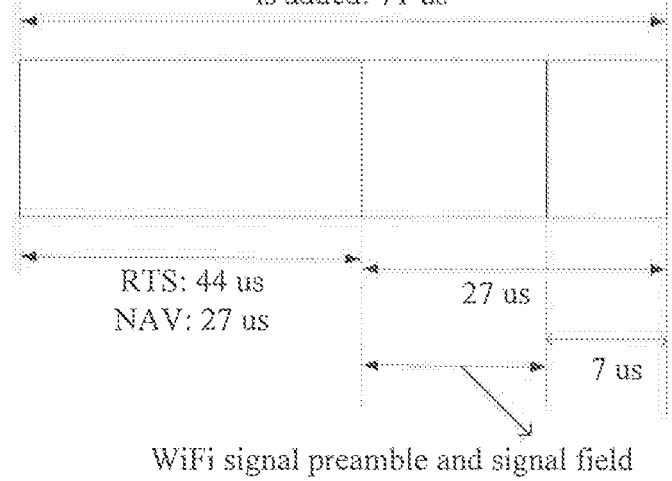
FIG. 20 is a schematic diagram 2 of a method for padding a remaining duration according to an embodiment of the present invention.

Based on the example in FIG. 20, the 7 us remaining duration may be padded with the invalid data, to further prevent an unlicensed control channel from being preempted by an intra-system or an inter-system in the 7 us.

It should be noted that, both FIG. 19 and FIG. 20 are described by using the OFDM symbols 3 to 12 in the example shown in the manner 1 as an example. A padding manner of a remaining duration of the OFDM symbol 13 is similar thereto. Details are not described herein. In addition, a padding manner of a remaining duration of an OFDM symbol in any optional implementation in the foregoing manners 1 to 4 is similar thereto. Details are not described one by one herein.

Further, optionally, if the padding information in the target OFDM symbol includes either of the following information: the combination of the WiFi signal preamble and the signal field or the combination of the WiFi signal preamble, the signal field, and the invalid data, and the padding information in the target OFDM symbol is sent after the channel reservation signal in the OFDM symbol, a length field in the signal field is marked as 0. This avoids the following case: The channel reservation signal receiving party receives and parses subsequent data according to the length field, and therefore incorrectly considers a complete channel reservation signal as LAA service data.

If the padding information in the target OFDM symbol includes either of the following information: the combination of the WiFi signal preamble and the signal field or the combination of the WiFi signal preamble, the signal field, and the invalid data, and the padding information in the target OFDM symbol is sent before the channel reservation signal in the OFDM symbol, a length field in the signal field is marked as 0 or a duration left after the target OFDM symbol is occupied by the signal preamble and the signal field. In this case, the padding information is located before the channel reservation signal, and usually, a duration reserved by the length field in the padding information is relatively short. Therefore, the duration reserved by the length field is not occupied by the channel reservation signal, and the channel reservation signal receiving party does not incorrectly consider a complete channel reservation signal as LAA service data. Therefore, the length field may be padded with a relatively small value. Specifically, the value may be any value that is less than or equal to a duration occupied by a subsequent channel reservation signal.

It should be noted that, all RTS frames or CTS frames with different NAV fields and different modulation schemes, locations of the RTS frames or the CTS frames in the OFDM symbols, and the like in any one of the foregoing optional embodiments or implementations may be combined for use according to actual use cases, including but not limited to the foregoing examples. In addition, because modulation schemes and code rates can be exhausted, a sequence of the RTS frame or the CTS frame may be preset, or certainly may be generated when the RTS frame or the CTS frame needs to be sent. This is not limited in this embodiment of the present invention.

An embodiment of the present invention further provides a method for sending a channel reservation signal. Specifically, before sending the channel reservation signal on the unlicensed channel, the base station first performs sample-rate conversion on the channel reservation signal, to obtain a target signal, where a sampling rate of the target signal is a sampling rate of an LAA signal. In this case, that the base station sends a channel reservation signal on the unlicensed channel may include: sending, by the base station, the target signal on the unlicensed channel.

The channel reservation signal meets a WiFi frame format. Therefore, the channel reservation signal has a sampling rate of a WiFi signal. However, the sampling rate of the WiFi signal is different from the sampling rate of the LAA signal. An example in which a system bandwidth is 20 MHz is used. The sampling rate of the WiFi signal is 20 MHz, and the sampling rate of the LAA signal is 30.72 MHz. To implement co-hardware sending of the LAA signal and the channel reservation signal, specifically, to implement that the LAA signal and the channel reservation signal can share a radio frequency link in a time division multiplexing manner, the base station may convert the sampling rate of the channel reservation signal into the sampling rate of the LAA signal before sending the channel reservation signal. This can save hardware resources and reduce costs.

A sample-rate conversion process may be implemented by using software. In essence, the sample-rate conversion is cascading of single-stage filters or multi-stage filters. The sample-rate conversion includes sampling rate increasing and sampling rate decreasing. Sampling rate increasing is usually implemented by means of interpolation, and sampling rate decreasing is usually implemented by means of extraction. For a specific implementation process thereof, refer to the prior art.

In an optional embodiment, the sending, by the base station if a detection result of the CCA is that the unlicensed channel is idle, the channel reservation signal on the unlicensed channel may include: in a cross-carrier scheduling scenario, if the detection result of the CCA is that the unlicensed channel is idle, sending, by the base station, the channel reservation signal on the last one or more OFDM symbols of the unlicensed channel that is/are used to carry control data.

One subframe includes 14 OFDM symbols. Each downlink subframe is divided into two parts, that is, a control region and a data region. The control region is used to transmit control data, and the data region is used to transmit service data. For a system with a relatively high bandwidth, the control region generally includes one to three OFDM symbols. For a system with a relatively low bandwidth, the control region generally includes two to four OFDM symbols.

The cross-carrier scheduling scenario may be understood as follows: A licensed serving cell uses a licensed channel to send control data of an unlicensed serving cell. An LAA system with cross-carrier scheduling has a licensed serving cell and an unlicensed serving cell, the licensed serving cell uses a licensed channel to communicate with a terminal, and the unlicensed serving cell uses an unlicensed channel to communicate with the terminal. In the cross-carrier scheduling scenario, the licensed serving cell uses the licensed channel to send the control data of the unlicensed serving cell. Therefore, a control region of the unlicensed channel is in an idle state, and the base station can send the channel reservation signal in the control region of the unlicensed channel. In this way, resources in the control region of the unlicensed channel are effectively utilized. In addition, in the following scenarios, sending a channel reservation signal by using a cross-carrier scheduling mechanism provided in this embodiment can further increase spectral efficiency.

Scenario 1: With reference to the foregoing optional embodiments, when the base station sends a second channel reservation signal or a group of channel reservation signals other than the first group of a plurality of groups of channel reservation signals, performance of a subframe in which the second channel reservation signal is located or a subframe in which the non-first group of channel reservation signals are located may be decreased. Scenario 2: If a duration from a moment at which the detection result of the CCA is that the unlicensed channel is idle, to a next subframe start boundary is not sufficient for sending the channel reservation signal, the channel reservation signal needs to be sent in a next subframe. This may decrease the spectral efficiency. Therefore, in the two scenarios, sending a channel reservation signal by using the cross-carrier scheduling mechanism provided in this embodiment can increase the spectral efficiency.

Figure 21:
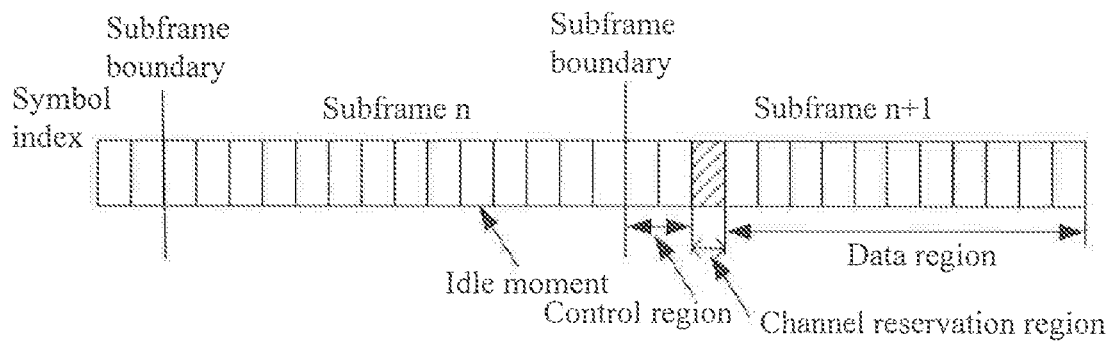
FIG. 21 is a schematic diagram 5 of sending a channel reservation signal according to an embodiment of the present invention.

Specifically, the first OFDM symbol of a subframe carries pilot data, and during four-antenna-port sending, pilot data also exists on the second OFDM symbol. Therefore, assuming that a control region includes three OFDM symbols, the channel reservation signal may be sent on the third OFDM symbol. Optionally, if the control region further includes the fourth OFDM symbol, the channel reservation signal may alternatively be sent on the fourth OFDM symbol. FIG. 21 shows a method for sending a channel reservation signal according to an embodiment of the present invention. The base station sends the channel reservation signal on the third OFDM symbol of a subframe subsequent to the moment at which the detection result of the CCA is that the unlicensed channel is idle.

In an optional embodiment, the method may further include: sending, by the base station, a configuration message to a target terminal. The configuration message includes a quantity r of OFDM symbols in a target subframe that carry the channel reservation signal and a quantity R of OFDM symbols in the target subframe that are used to carry control data, to instruct the target terminal to start receiving/demodulating service data from an $(R+r+1)^{th}$ OFDM symbol (an index of an OFDM symbol starts from 1) in the target subframe. The target subframe is a subframe that carries the channel reservation signal, and both R and r are integers greater than or equal to 1.

The "target terminal" may be any one or more terminals in coverage of the base station. The target subframe is each subframe that carries the channel reservation signal. If the base station sends a group of channel reservation signals, the target subframe is a subframe subsequent to the moment at which the detection result of the CCA is that the unlicensed channel is idle, for example, a subframe n+1 in FIG. 21.

The sending, by the base station, a configuration message to a target terminal may include: sending, by the base station to the target terminal by using a PCFICH, the quantity R of the OFDM symbols in the target subframe that are used to carry the control data, and sending, by the base station to the target terminal by using a PDCCH, the quantity r of the OFDM symbols in the target subframe that carry the channel reservation signal.

In the prior art, a subframe includes two parts, that is, a control region and a data region. Therefore, if the base station sends, to the target terminal, the quantity R of the OFDM symbols that are used to carry the control data, it indicates that R OFDM symbols are used to carry the control data, that is, the service data is carried starting from an $(R+1)^{th}$ OFDM symbol, and the target terminal starts receiving/parsing the service data from the $(R+1)^{th}$ OFDM symbol. In this embodiment, a subframe is divided into three parts, that is, a control region, a channel reservation region, and a data region, where the channel reservation region is used to send a channel reservation signal. Therefore, the base station further needs to send, to the target terminal, the quantity r of the OFDM symbols in the target subframe that carry the channel reservation signal, to indicate that the base station uses r OFDM symbols to carry the channel reservation signal. That is, the service data is carried starting from the $(R+r+1)^{th}$ OFDM symbol, and the target terminal needs to start to receive/parse the service data from the $(R+r+1)^{th}$ OFDM symbol.

In an optional embodiment, the system signal is a WiFi signal, and the method may further include: sending, by the base station, an RTS frame to a target terminal, where a receiver MAC address field of the RTS frame is used to mark a MAC address of a WiFi chip of the target terminal, so that the target terminal broadcasts a CTS frame, and information used to indicate the to-be-reserved duration is marked in the CTS frame, and so that a device that receives the CTS frame does not send data in the to-be-reserved duration.

Specifically, an NAV field in the RTS frame may mark a difference between a total duration and a duration occupied by the RTS frame. The total duration is a time segment from the moment at which the detection result of the CCA is that the unlicensed channel is idle to a moment at which transmission of the LAA service data ends, and includes the to-be-reserved duration, that is, a transmission duration of the LAA service data. An NAV field in the CTS frame may mark a duration related to the NAV field in the RTS frame, and the duration is a duration obtained by subtracting a short interframe space (SIFS) and then CTS frame from a duration marked by the NAV field in the RTS frame.

The "target terminal" may be any one or more terminals in coverage of the base station. This embodiment provides a mechanism in which the base station sends the RTS frame to the target terminal. Devices (including a terminal, a base station, and the like) around the target terminal can receive the CTS frame. After receiving the CTS frame, these devices do not send data in the to-be-reserved duration. This can reduce interference caused by the surrounding devices to the target terminal, and further improve communication quality of communication between the base station in the LAA system and the target terminal.

Figure 22:
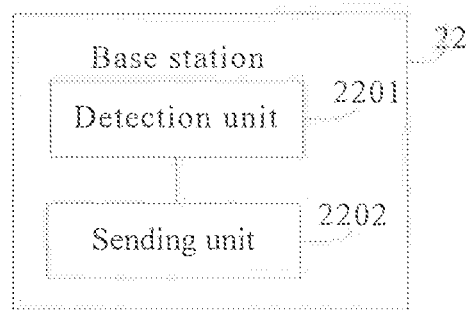
FIG. 22 is a schematic structural diagram 1 of a base station according to an embodiment of the present invention.

Referring to FIG. 22, FIG. 22 is a schematic structural diagram of a base station 22 according to an embodiment of the present invention. The base station 22 is configured to perform steps that are performed by the base station 22 in the foregoing method for sending a channel reservation signal. The base station 22 may include modules corresponding to the steps. For example, the base station 22 may include a detection unit 2201 and a sending unit 2202.

The detection unit 2201 is configured to detect whether the base station receives a system signal on an unlicensed channel.

The sending unit 2202 is configured to: if the detection unit 2201 detects that the base station receives the system signal on the unlicensed channel, send a channel reservation signal on the unlicensed channel to reserve the unlicensed channel.

Optionally, the detection unit 2201 is further configured to: if detecting that the base station receives the system signal on the unlicensed channel, perform clear channel assessment CCA. In this case, the sending unit 2202 is specifically configured to: if a detection result of the CCA is that the unlicensed channel is idle, send the channel reservation signal on the unlicensed channel to reserve the unlicensed channel.

Optionally, the sending unit 2202 is specifically configured to detect, in each detection period, whether the base station receives the system signal on the unlicensed channel, where the detection period includes one or more detection durations. In this case, the detection unit 2201 is specifically configured to: if detecting, in any one detection duration, that the base station receives the system signal on the unlicensed channel, stop detection of the system signal in a detection period to which the detection duration belongs, and perform CCA.

Optionally, when performing CCA, the detection unit 2201 is specifically configured to start, in a cell on/off mechanism, performing CCA in N subframes prior to a moment at which an LAA system to which the base station 22 belongs enters a cell on state, where a duration of the N subframes is greater than or equal to a maximum duration of one-time data sending in a system to which the system signal belongs.

Optionally, the CCA meets at least one of the following conditions: Condition 1: a value of a detection threshold for the CCA is less than or equal to d, where d represents a smaller value between a detection threshold used by the base station 22 to perform CCA for an intra-system and a detection threshold used by the base station 22 to perform CCA for an inter-system; or Condition 2: a detection duration of the CCA is greater than or equal to a larger value between a detection duration of CCA performed by the base station 22 for an intra-system and a detection duration of CCA performed by the base station 22 for an inter-system; or Condition 3: a defer duration of the CCA process is greater than or equal to a larger value between a defer duration of CCA performed by the base station for an intra-system and a defer duration of CCA performed by the base station for an inter-system.

Optionally, the sending unit 2202 is specifically configured to successively send S channel reservation signals on the unlicensed channel, where a reservation field of an 5th channel reservation signal is used to mark a sum of a to-be-reserved duration and a duration occupied by the $(s+1)^{th}$ channel reservation signal to the St channel reservation signal, where $1 \leq s \leq S$, both S and s are integers, and the to-be-reserved duration is a duration required for data transmission on the unlicensed channel.

Optionally, the sending unit 2202 is specifically configured to send the channel reservation signal on each target OFDM symbol on the unlicensed channel, where the target OFDM symbols are P OFDM symbols starting from the first OFDM symbol following an OFDM symbol of a target moment, the target moment is a moment at which the detection unit 2201 determines that the detection result of the CCA is that the unlicensed channel is idle, and P is an integer greater than or equal to 1.

In this optional implementation, if P is greater than 1, a method for marking a reservation field of a channel reservation signal on the target OFDM symbol includes but is not limited to the following manners 1 to 3:

Manner 1: A reservation field of the channel reservation signal sent on a $p^{th}$ target OFDM symbol is used to mark a duration left after the $p^{th}$ target OFDM symbol is occupied by the channel reservation signal, and a reservation field of the channel reservation signal sent on a $P^{th}$ target OFDM symbol is used to mark a sum of a to-be-reserved duration and a duration left after the $P^{th}$ target OFDM symbol is occupied by the channel reservation signal, where $1 \leq p < P$, and p is an integer.

Manner 2: A reservation field of each channel reservation signal sent on each target OFDM symbol is used to mark a sum of a to-be-reserved duration and a duration left after the target OFDM symbol is occupied by the channel reservation signal.

Manner 3: A reservation field of the channel reservation signal sent on an $m^{th}$ target OFDM symbol is used to mark a sum of a to-be-reserved duration and (P−m)*OFDM symbol durations, where $1 \leq m \leq P$, and m is an integer.

Further, optionally, the system signal is a WiFi signal; and a duration left after any one or more target OFDM symbols are occupied by the channel reservation signal is padded with any one piece of the following information: a WiFi control frame; or a combination of a WiFi signal preamble and a signal field; or a combination of a WiFi signal preamble, a signal field, and invalid data.

Specifically, if the padding information in the target OFDM symbol includes either of the following information: the combination of the WiFi signal preamble and the signal field or the combination of the WiFi signal preamble, the signal field, and the invalid data, and the padding information in the target OFDM symbol is sent after the channel reservation signal in the OFDM symbol, a length field in the signal field is marked as 0.

Alternatively, if the padding information in the target OFDM symbol includes either of the following information: the combination of the WiFi signal preamble and the signal field or the combination of the WiFi signal preamble, the signal field, and the invalid data, and the padding information in the target OFDM symbol is sent before the channel reservation signal in the OFDM symbol, a length field in the signal field is marked as 0 or a duration left after the target OFDM symbol is occupied by the signal preamble and the signal field.

Optionally, the sending unit 2202 is specifically configured to:

send a first channel reservation signal on the unlicensed channel, and send a second channel reservation signal after a preset time segment expires, where a modulation order of data transmitted in a subframe of the second channel reservation signal is less than or equal to a modulation order of data transmitted in a subframe reserved by the first channel reservation signal, and a code rate of the data transmitted in the subframe of the second channel reservation signal is less than or equal to a code rate of the data transmitted in the subframe reserved by the first channel reservation signal.

Figure 23:
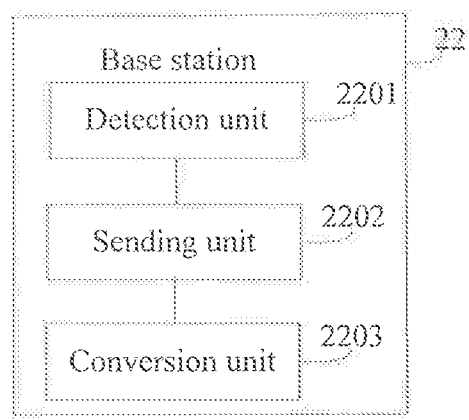
FIG. 23 is a schematic structural diagram 2 of a base station according to an embodiment of the present invention.

Optionally, as shown in FIG. 23, the base station 22 may further include: a conversion unit 2203, configured to: before the sending unit 2202 sends the channel reservation signal on the unlicensed channel, perform sample-rate conversion on the channel reservation signal, to obtain a target signal, where a sampling rate of the target signal is a sampling rate of an LAA signal. In this case, the sending unit 2202 is specifically configured to send the target signal on the unlicensed channel.

Optionally, the system signal is a WiFi signal; and the sending unit 2202 is further configured to send a request to send RTS frame to a target terminal, where a receiver Media Access Control MAC address field of the RTS frame is used to mark a MAC address of a WiFi chip of the target terminal, so that the terminal broadcasts a clear to send CTS frame, and information used to indicate the to-be-reserved duration is marked in the CTS frame, so that a device that receives the CTS frame does not send data in the to-be-reserved duration.

Optionally, the system signal is a WiFi signal, the to-be-reserved duration is T, a largest duration reserved by the combination of the WiFi signal preamble and the signal field is a, and a largest duration reserved by the WiFi control frame is b. In this case, that the sending unit 2202 sends the channel reservation signal on the unlicensed channel may include but is not limited to any one of the following several cases:

When $T \leq a$, the sending unit 2202 sends, on the unlicensed channel, one group of channel reservation signals represented by the combination of the WiFi signal preamble and the signal field, or one group of channel reservation signals represented by the WiFi control frame.

When a<T≤b, the sending unit 2202 sends, on the unlicensed channel, a plurality of groups of channel reservation signals represented by the combination of the WiFi signal preamble and the signal field, or one group of channel reservation signals represented by the WiFi control frame.

When T>b, the sending unit 2202 sends, on the unlicensed channel, a plurality of groups of channel reservation signals represented by the combination of the WiFi signal preamble and the signal field, or a plurality of groups of channel reservation signals represented by the WiFi control frame, or one or more groups of channel reservation signals represented by the combination of the WiFi signal preamble and the signal field and one or more groups of channel reservation signals represented by the WiFi control frame.

Optionally, the sending unit 2202 may be specifically configured to: send, in a cell on/off mechanism, the channel reservation signal on the unlicensed channel on one or more OFDM symbols prior to a moment at which an LAA system to which the base station belongs enters a cell on state; or send, in a cell on/off mechanism, the channel reservation signal on the unlicensed channel on one or more OFDM symbols following a moment at which an LAA system to which the base station belongs enters a cell on state; or send, in a cell on/off mechanism, the channel reservation signal on the unlicensed channel on one or more OFDM symbols in a data region following a moment at which an LAA system to which the base station belongs enters a cell on state.

Optionally, the sending unit 2202 is specifically configured to: if the detection result of the CCA is that the unlicensed channel is idle, send the channel reservation signal on the last one or more OFDM symbols of the unlicensed channel that is/are used to carry control data.

Optionally, the sending unit 2202 is specifically configured to: if the detection result of the CCA is that the unlicensed channel is idle, and T1≥ T2, after the CCA detection ends, send the channel reservation signal on the unlicensed channel by deferring a T1-T2 duration, to reserve the unlicensed channel; or if the detection result of the CCA is that the unlicensed channel is idle, and T1<T2, send the channel reservation signal on the unlicensed channel to reserve the unlicensed channel, where T1 is a delay of switching, by the LAA system to which the base station belongs, from uplink transmission to downlink transmission, and T2 is a time required by the base station to send the channel reservation signal to an air interface.

It may be understood that the base station 22 in this embodiment of the present invention may correspond to the base station in the method for sending a channel reservation signal in the foregoing embodiments, and division and/or functions of the modules in the base station 22 in this embodiment of the present invention are intended to implement the foregoing method procedure. For brevity, details are not described herein.

The base station 22 in this embodiment of the present invention can be configured to perform the foregoing method procedure. Therefore, for a technical effect that can be achieved by the base station, refer to the foregoing method embodiments. Details are not described again in this embodiment of the present invention.

Figure 24:
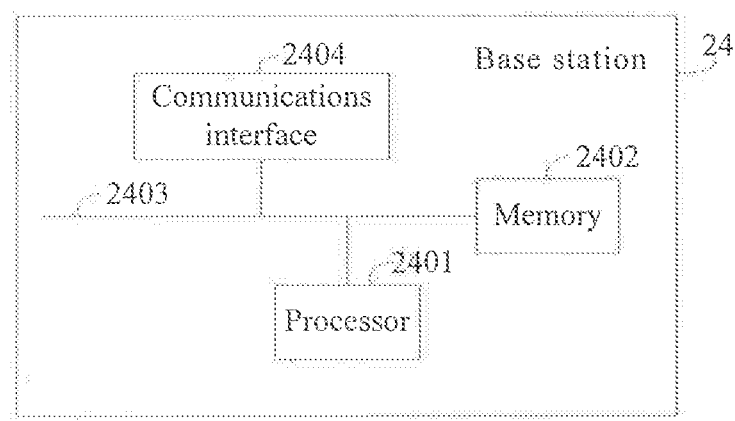
FIG. 24 is a schematic structural diagram 3 of a base station according to an embodiment of the present invention.

Referring to FIG. 24, FIG. 24 is a schematic structural diagram of a base station 24 according to an embodiment of the present invention. The base station 24 may include a processor 2401, a memory 2402, a system bus 2403, and a communications interface 2404.

The memory 2402 is configured to store a computer executable instruction; the processor 2401 is connected to the memory 2402 by using the system bus; and when the base station 24 runs, the processor 2401 executes the computer executable instruction stored in the memory 2402, so that the base station 24 performs any one of the foregoing methods for sending a channel reservation signal.

For a specific method for sending a channel reservation signal, refer to the related descriptions in the foregoing embodiments. Details are not described herein again.

This embodiment further provides a storage medium. The storage medium may be the memory 2402.

The processor 2401 may be a central processing unit (CPU). The processor 2401 may alternatively be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor, or the like.

The processor 2401 may be a dedicated processor. The dedicated processor may include at least one of a baseband processing chip, a radio frequency processing chip, or the like. Further, the dedicated processor may further include a chip having another dedicated processing function of the base station 24.

The memory 2402 may include a volatile memory, for example, a random access memory (RAM). The memory 2402 may alternatively include a non-volatile memory, for example, a read-only memory (ROM), a flash memory, a hard disk drive (HDD), or a solid-state drive (SSD). The memory 2402 may alternatively include a combination of the foregoing types of memories.

The system bus 2403 may include a data bus, a power bus, a control bus, a signal state bus, and the like. In this embodiment, for clarity, various buses are indicated as the system bus 2403 in FIG. 24.

The communications interface 2404 may be specifically a transceiver on the base station 24. The transceiver may be a wireless transceiver. For example, the wireless transceiver may be an antenna of the base station 24, or the like. The processor 2401 sends data to or receives data from another device, for example, a terminal, by using the communications interface 2404.

In a specific implementation process, steps in any one of the foregoing method procedures may be implemented by the hardware processor 2401 in a hardware form by executing the software computer executable instruction in a software form that is stored in the memory 2402. To avoid repetition, details are not described herein.

The base station 24 in this embodiment of the present invention can be configured to perform the foregoing method procedure. Therefore, for a technical effect that can be achieved by the base station, refer to the foregoing method embodiments. Details are not described herein again.

It may be clearly understood by a person skilled in the art that, for the purpose of convenient and brief description, in the apparatus described above, division of the foregoing function modules is taken as an example for description. In actual application, the foregoing functions can be allocated to different modules and implemented according to a requirement, that is, an inner structure of the apparatus is divided into different function modules to implement all or some of the functions described above. For a detailed working process of the foregoing system, apparatus, and unit, refer to the corresponding process in the foregoing method embodiments, and details are not described herein.

In the embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings, or direct couplings, or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes instructions for instructing a computer device (that may be a personal computer, a server, or a network device) or a processor to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

The foregoing descriptions are merely specific implementations of embodiments of the present invention, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for sending a channel reservation signal, the method comprising:
   detecting, by a base station, whether a system signal is received at the base station on an unlicensed channel, wherein the system signal is a wireless fidelity (WiFi) signal in a WiFi system;
   performing, by the base station, clear channel assessment (CCA) based on detecting that the system signal is received on the unlicensed channel,
   wherein the CCA is started by the base station in a cell on/off mechanism,
   wherein the CCA is started in N subframes prior to a moment at which a licensed-assisted access (LAA) system, to which the base station belongs, enters a cell-on state, and
   wherein a duration of the N subframes is a transmit opportunity (TXOP) in the WiFi system; and
   sending, by the base station, a channel reservation signal on the unlicensed channel to reserve the unlicensed channel based on the CCA indicating that the unlicensed channel is idle.

2. The method according to claim 1, wherein detecting, by the base station, whether the system signal is received at the base station on the unlicensed channel comprises:
   detecting, by the base station in each of one or more detection periods, whether the system signal is received at the base station on the unlicensed channel, wherein each detection period comprises one or more detection durations; and
   performing, by the base station, the CCA further comprises:
      stopping, by the base station, detection of the system signal in one of the detection periods based on detecting, in one of the detection durations, that the base station receives the system signal on the unlicensed channel, and performing the CCA.

3. The method according to claim 1, wherein the CCA meets at least one of the following conditions:
   a value of a detection threshold for the CCA is less than or equal to d,
      wherein d represents a smaller value between a detection threshold used by the base station to perform CCA for an intra-system and a detection threshold used by the base station to perform CCA for an inter-system;
   a detection duration of the CCA is greater than or equal to a larger value between a detection duration of CCA performed by the base station for an intra-system and a detection duration of CCA performed by the base station for an inter-system; or
   a defer duration of the CCA is greater than or equal to a larger value between a defer duration of CCA performed by the base station for an intra-system and a defer duration of CCA performed by the base station for an inter-system.

4. The method according to claim 1, wherein sending, by the base station, the channel reservation signal on the unlicensed channel comprises:
   successively sending, by the base station, S channel reservation signals on the unlicensed channel,
      wherein a duration of a reservation field of an $s^{th}$ channel reservation signal is $(S-s)*T_0+T$, wherein $1 \leq s \leq S$, both S and s are integers, S is a total number of channel reservation signals, $T_0$ is a duration occupied by the $s^{th}$ channel reservation signal, and T is a to-be-reserved duration for data transmission on the unlicensed channel.

5. The method according to claim 1, wherein sending, by the base station, the channel reservation signal on the unlicensed channel comprises:
   sending, by the base station, the channel reservation signal on each target orthogonal frequency division multiplexing (OFDM) symbol on the unlicensed channel,
      wherein the target OFDM symbols are P OFDM symbols starting from a first OFDM symbol following an OFDM symbol of a target moment, wherein the target moment is a moment at which the base station determines that the unlicensed channel is idle, and wherein P is an integer greater than or equal to 1.

6. The method according to claim 5, wherein P is greater than 1, and wherein:

a reservation field of the channel reservation signal sent on a $p^{th}$ target OFDM symbol indicates a duration left after the $p^{th}$ target OFDM symbol is occupied by the channel reservation signal, and a reservation field of the channel reservation signal sent on a $P^{th}$ target OFDM symbol indicates a sum of a to-be-reserved duration, wherein a duration left after the $P^{th}$ target OFDM symbol is occupied by the channel reservation signal, and wherein 1≤p<P, and p is an integer;

a reservation field of the channel reservation signal sent on each target OFDM symbol indicates a sum of a to-be-reserved duration and a duration left after the target OFDM symbol is occupied by the channel reservation signal; or a reservation field of the channel reservation signal sent on an $m^{th}$ target OFDM symbol indicates a sum of a to-be-reserved duration and (P−m)*OFDM symbol durations, wherein 1≤m≤P, and m is an integer.

7. The method according to claim 5, wherein padding information is further sent in a duration left after each of the target OFDM symbols is occupied by the channel reservation signal, and the padding information comprises any one piece of the following information:

a WiFi control frame;

a combination of a WiFi signal preamble and a signal field; or a combination of a WiFi signal preamble, a signal field, and invalid data.

8. The method according to claim 7, wherein:

sending the padding information in each of the target OFDM symbols after (i) the channel reservation signal in each of the target OFDM symbols, and (ii) a length field in the signal field is marked as 0 in response to the padding information in each of the target OFDM symbols comprising either of the following:

(i) the combination of the WiFi signal preamble and the signal field, or (ii) the combination of the WiFi signal preamble, the signal field, and the invalid data; or sending the padding information in each of the target OFDM symbols before (i) the channel reservation signal in each of the target OFDM symbols, and (ii) the length field in the signal field is marked as 0 or a duration left after each of the target OFDM symbols is occupied by the signal preamble and the signal field in response to the padding information in the target OFDM symbol comprising either of the following information:

(i) the combination of the WiFi signal preamble and the signal field, or (ii) the combination of the WiFi signal preamble, the signal field, and the invalid data.

9. The method according to claim 1, wherein sending, by the base station, the channel reservation signal on the unlicensed channel comprises:

sending, by the base station, a first channel reservation signal on the unlicensed channel; and sending a second channel reservation signal after a preset time segment expires, wherein a modulation order of data transmitted in a subframe of the second channel reservation signal is less than or equal to a modulation order of data transmitted in a subframe reserved by the first channel reservation signal, and a code rate of the data transmitted in the subframe of the second channel reservation signal is less than or equal to a code rate of the data transmitted in the subframe reserved by the first channel reservation signal.

10. The method according to claim 1, wherein before sending, by the base station, the channel reservation signal on the unlicensed channel, the method further comprises:

performing, by the base station, sample-rate conversion on the channel reservation signal, wherein a sampling rate of the sample-rate conversion is a sampling rate of an a licensed-assisted access (LAA) signal.

11. The method according to claim 1, wherein sending, by the base station, the channel reservation signal on the unlicensed channel comprises:

sending, by the base station in the cell on/off mechanism, the channel reservation signal on the unlicensed channel on one or more orthogonal frequency division multiplexing (OFDM) symbols prior to a moment at which the LAA system to which the base station belongs enters a cell on state; or sending, by the base station in the cell on/off mechanism, the channel reservation signal on the unlicensed channel on one or more OFDM symbols following the moment at which the LAA system to which the base station belongs enters the cell on state; or sending, by the base station in the cell on/off mechanism, the channel reservation signal on the unlicensed channel on one or more OFDM symbols in a data region following the moment at which the LAA system to which the base station belongs enters the cell on state.

12. The method according to claim 1, wherein sending, by the base station, the channel reservation signal on the unlicensed channel to reserve the unlicensed channel comprises:

based on the CCA indicating that the unlicensed channel is idle and T1≥T2, after the CCA ends, sending, by the base station, the channel reservation signal on the unlicensed channel by deferring a T1-T2 duration, to reserve the unlicensed channel; or based on the CCA indicating that the unlicensed channel is idle and T1<T2, sending, by the base station, the channel reservation signal on the unlicensed channel to reserve the unlicensed channel, wherein T1 is a delay of switching, by the licensed-assisted access LAA system to which the base station belongs, from uplink transmission to downlink transmission, and wherein T2 is a time required by the base station to send the channel reservation signal to a transmitter.

13. An apparatus comprising:

a processor and a non-transitory computer-readable storage medium coupled to the processor and storing programming instructions for execution by the processor, the programming instructions, when executed by the processor, facilitate performing:

detecting whether a system signal on an unlicensed channel is received, wherein the system signal is a wireless fidelity (WiFi) signal in a WiFi system;

performing clear channel assessment (CCA) based on detecting that the system signal is received on the unlicensed channel, wherein the CCA is started in a cell on/off mechanism, wherein the CCA is started in N subframes prior to a moment at which a licensed-assisted access (LAA) system enters a cell-on state, and wherein a duration of the N subframes is a transmit opportunity (TXOP) in the WiFi system; and sending a channel reservation signal on the unlicensed channel to reserve the unlicensed channel based on the CCA indicating that the unlicensed channel is idle.

14. The apparatus according to claim 13, wherein the processor further facilitates performing:

detecting, in each of one or more detection periods, whether the system signal on the unlicensed channel is received, wherein each detection period comprises one or more detection durations; and based on detecting, in a detection duration, that the base station receives the system signal on the unlicensed channel, stopping detection of the system signal in the detection period to which the detection duration belongs, and performing CCA.

15. The apparatus according to claim 13, wherein the CCA meets at least one of the following conditions:

a value of a detection threshold for the CCA is less than or equal to d, wherein d represents a smaller value between a detection threshold used by the apparatus to perform CCA for an intra-system and a detection threshold used by the apparatus to perform CCA for an inter-system; or a detection duration of the CCA is greater than or equal to a larger value between a detection duration of CCA performed by the apparatus for an intra-system and a detection duration of CCA performed by the apparatus for an inter-system; or a defer duration of the CCA is greater than or equal to a larger value between a defer duration of CCA performed by the apparatus for an intra-system and a defer duration of CCA performed by the apparatus for an inter-system.

16. The apparatus according to claim 13, wherein the processor further facilitates performing:

successively sending S channel reservation signals on the unlicensed channel, wherein a reservation field of an $s^{th}$ channel reservation signal is $(S-s)*T_0+T$, wherein $1 \leq s \leq S$, both S and s are integers, To is a duration occupied by a channel reservation signal, and T is a to-be-reserved duration which is a duration for data transmission on the unlicensed channel.

17. The apparatus according to claim 13, wherein the processor further facilitates performing:

sending the channel reservation signal on each target orthogonal frequency division multiplexing (OFDM) symbol on the unlicensed channel, wherein the target OFDM symbols are P OFDM symbols starting from a first OFDM symbol following an OFDM symbol of a target moment, wherein the target moment is a moment at which the apparatus determines that the unlicensed channel is idle, and wherein P is an integer greater than or equal to 1.

18. The apparatus according to claim 17, wherein P is greater than 1, and wherein:

a reservation field of the channel reservation signal sent on a $p^{th}$ target OFDM symbol indicates a duration left after the $p^{th}$ target OFDM symbol is occupied by the channel reservation signal, and a reservation field of the channel reservation signal sent on a $P^{th}$ target OFDM symbol indicates a sum of a to-be-reserved duration, wherein a duration left after the $P^{th}$ target OFDM symbol is occupied by the channel reservation signal, and wherein $1 \leq p < P$, and p is an integer;

a reservation field of the channel reservation signal sent on each target OFDM symbol indicates a sum of a to-be-reserved duration and a duration left after the target OFDM symbol is occupied by the channel reservation signal; or a reservation field of the channel reservation signal sent on an $m^{th}$ target OFDM symbol indicates a sum of a to-be-reserved duration and (P−m)*OFDM symbol durations, wherein $1 \leq m \leq P$, and m is an integer.

19. The apparatus according to claim 17, wherein padding information is further sent in a duration left after each of the target OFDM symbols is occupied by the channel reservation signal, and the padding information comprises any one piece of the following information:

a WiFi control frame;

a combination of a WiFi signal preamble and a signal field; or a combination of a WiFi signal preamble, a signal field, and invalid data.

20. The apparatus according to claim 19, wherein:

sending the padding information in each of the target OFDM symbols after (i) the channel reservation signal in each of the target OFDM symbols, and (ii) a length field in the signal field is marked as 0 in response to the padding information in each of the target OFDM symbols comprising either of the following:

(i) the combination of the WiFi signal preamble and the signal field, or (ii) the combination of the WiFi signal preamble, the signal field, and the invalid data; or sending the padding information in each of the target OFDM symbols before (i) the channel reservation signal in each of the OFDM symbols, and (ii) a length field in the signal field is marked as 0 or a duration left after each of the target OFDM symbols is occupied by the signal preamble and the signal field in response to the padding information in each of the target OFDM symbols comprising either of the following information:

(i) the combination of the WiFi signal preamble and the signal field, or (ii) the combination of the WiFi signal preamble, the signal field, and the invalid data.

21. The apparatus according to claim 13, wherein the processor further facilitates performing:

sample-rate conversion on the channel reservation signal to obtain a target signal, wherein a sampling rate of the target signal is a sampling rate of a licensed-assisted access (LAA) signal; and sending the target signal on the unlicensed channel.

22. The apparatus according to claim 13, wherein the processor further facilitates performing:

sending a request to send (RTS) frame to a target terminal, wherein a receiver media access control (MAC) address field of the RTS frame is used to mark a MAC address of a WiFi chip of the target terminal.

23. The apparatus according to claim 13, wherein the processor further facilitates performing:

sending the channel reservation signal on the unlicensed channel on one or more orthogonal frequency division multiplexing (OFDM) symbols prior to a moment at which a the LAA system to which the base station belongs enters a cell on state; or sending the channel reservation signal on the unlicensed channel on one or more OFDM symbols following the moment at which the LAA system to which the apparatus belongs enters the cell on state; or sending the channel reservation signal on the unlicensed channel on one or more OFDM symbols in a data region following the moment at which the LAA system to which the apparatus belongs enters the cell on state.

24. The apparatus according to claim 13, wherein the processor further facilitates performing:

based on the CCA indicating that the unlicensed channel is idle and T1≥T2, after the CCA ends, send the channel reservation signal on the unlicensed channel by deferring a T1-T2 duration, to reserve the unlicensed channel; or based on the CCA indicating that the unlicensed channel is idle and T1<T2, send the channel reservation signal on the unlicensed channel to reserve the unlicensed channel, wherein T1 is a delay of switching, by the licensed-assisted access (LAA) system to which the base station belongs, from uplink transmission to downlink transmission, and wherein T2 is a time required by the base station to send the channel reservation signal to a transmitter.

* * * * *

UNITED STATES PATENT AND TRADEMARK OFFICE
CERTIFICATE OF CORRECTION

PATENT NO. : 10,735,998 B2
APPLICATION NO. : 16/016339
DATED : August 4, 2020
INVENTOR(S) : Li et al.

Page 1 of 1

It is certified that error appears in the above-identified patent and that said Letters Patent is hereby corrected as shown below:

In the Claims

Claim 23, Column 46, Line 66: "which a the LAA system to which the base station" should read -- which the LAA system to which the base station --.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*